(12) United States Patent
McNelly

(10) Patent No.: US 12,206,687 B2
(45) Date of Patent: Jan. 21, 2025

(54) AUTOMATED INCIDENT RESPONSE TRACKING AND ENHANCED FRAMEWORK FOR CYBER THREAT ANALYSIS

(71) Applicant: Trustwave Holdings Inc, Chicago, IL (US)

(72) Inventor: Brian McNelly, Boulder, CO (US)

(73) Assignee: Trustwave Holdings Inc, Chicago, IL (US)

( * ) Notice: Subject to any disclaimer, the term of this patent is extended or adjusted under 35 U.S.C. 154(b) by 106 days.

(21) Appl. No.: 18/090,581

(22) Filed: Dec. 29, 2022

(65) Prior Publication Data

US 2024/0223576 A1  Jul. 4, 2024

(51) Int. Cl.
*H04L 9/40* (2022.01)
*H04L 43/045* (2022.01)
*H04L 43/067* (2022.01)

(52) U.S. Cl.
CPC ........ *H04L 63/1416* (2013.01); *H04L 43/045* (2013.01); *H04L 43/067* (2013.01)

(58) Field of Classification Search
CPC . H04L 43/045; H04L 43/067; H04L 63/1416; H04L 63/102; H04L 63/1425; H04L 63/1441; H04L 63/145; H04L 63/20; H04L 67/535; G06F 21/50; G06N 7/01; H04W 24/04
See application file for complete search history.

(56) References Cited

U.S. PATENT DOCUMENTS

2018/0343277 A1* 11/2018 Drihem ............... H04L 63/1441
2018/0359272 A1* 12/2018 Mizrachi ............... H04L 67/535
2020/0137097 A1* 4/2020 Zimmermann ..... H04L 63/1425
2020/0267162 A1* 8/2020 Koottayi ................. G06F 21/50
2020/0314141 A1* 10/2020 Vajipayajula ......... H04L 63/145
2021/0173924 A1   6/2021 Trost et al.
2021/0273961 A1   9/2021 Humphrey et al.
(Continued)

FOREIGN PATENT DOCUMENTS

KR   20170074386 A   6/2017

OTHER PUBLICATIONS

Apr. 15, 2024—(WO) International Search Report and Written Opinion—App PCT/US2023/084223.

*Primary Examiner* — Le H Luu

(74) *Attorney, Agent, or Firm* — Banner & Witcoff, Ltd.

(57) ABSTRACT

Several features of cybersecurity frameworks are disclosed. In one example, a computing platform receives, from an enterprise user device, cyber threat investigation information indicating actions performed to address an identified threat for a client through an incident response lifecycle of the identified threat. This computing platform receives, from a client user device, a request for the cyber threat investigation information, and generates, using this cyber threat investigation information, a client interface, which includes a time-series graphical representation of the actions performed to address the identified threat and a play button, selection of which may cause automated progression through the time-series graphical representation within the client interface. This computing platform sends, to the client user device, the client interface and commands to display the client interface, which may cause the client user device to display the client interface.

20 Claims, 16 Drawing Sheets

(56) References Cited

U.S. PATENT DOCUMENTS

| | | | |
|---|---|---|---|
| 2022/0124084 A1* | 4/2022 | Maylor | H04L 63/102 |
| 2022/0232040 A1* | 7/2022 | Crabtree | H04L 63/20 |
| 2022/0263860 A1 | 8/2022 | Crabtree et al. | |
| 2022/0374796 A1* | 11/2022 | Raymond | G06N 7/01 |
| 2022/0385687 A1 | 12/2022 | McKinley et al. | |
| 2023/0007023 A1* | 1/2023 | Andrabi | H04L 63/1425 |
| 2023/0061099 A1* | 3/2023 | Cummings | H04W 24/04 |

\* cited by examiner

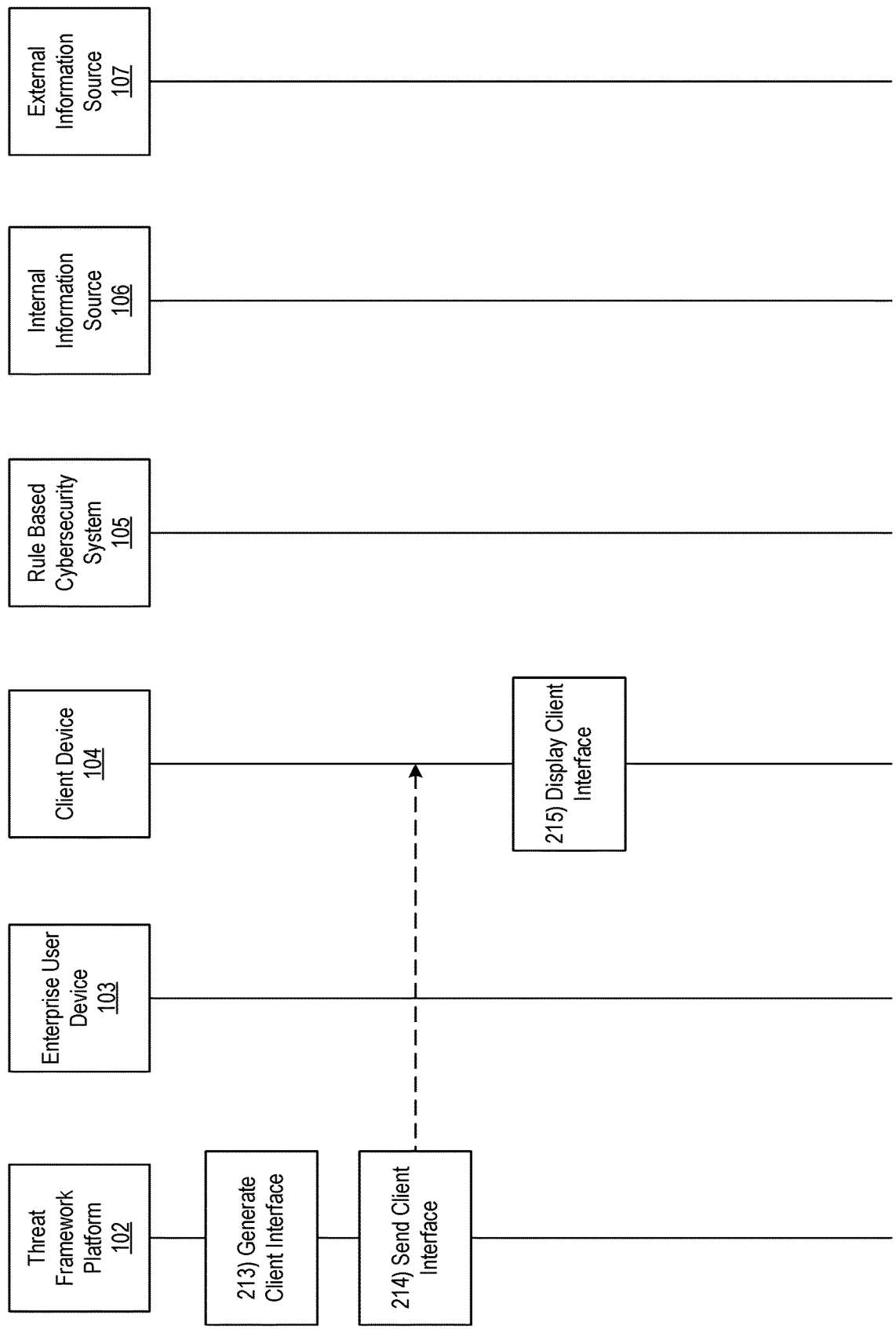

| Timestamp | Device Name | Generator Hostname | ID | SIEM Type | Message | Object Access | Process |
|---|---|---|---|---|---|---|---|
| > 2022-08-30 18:39:17 | Palo Alto Networks Firewall | pa-waw-1 | 000c29e34655-9-1661877591276-27a27 | fw.auth.grant.re | Aug 30 18:39:33 PAN_WAW_SOC_1,2022/08/30 18:39:33,007251000119860,TRAFFIC,end | dns | any |
| > 2022-08-30 18:39:15 | Palo Alto Networks Firewall | pa-waw-1 | 000c29e34655-9-1661877591276-27a26 | fw.auth.grant.re | Aug 30 18:39:33 PAN_WAW_SOC_1,2022/08/30 18:39:33,007251000119860,TRAFFIC,end | incomplete | any |
| > 2022-08-30 18:39:15 | Palo Alto Networks Firewall | pa-waw-1 | 000c29e34655-9-1661877591275-27a25 | fw.auth.grant.re | Aug 30 18:39:33 PAN_WAW_SOC_1,2022/08/30 18:39:33,007251000119860,TRAFFIC,end | incomplete | any |
| > 2022-08-30 18:39:13 | Palo Alto Networks Firewall | pa-waw-1 | 000c29e34655-9-1661877591276-27a28 | fw.auth.grant.re | Aug 30 18:39:33 PAN_WAW_SOC_1,2022/08/30 18:39:33,007251000119860,TRAFFIC,end | incomplete | any |
| > 2022-08-30 18:39:11 | Palo Alto Networks Firewall | pa-waw-1 | 000c29e34655-9-1661877591275-27a25 | fw.auth.grant.re | Aug 30 18:39:33 PAN_WAW_SOC_1,2022/08/30 18:39:33,007251000119860,TRAFFIC,end | not-applicable | any |
| > 2022-08-30 18:39:11 | Palo Alto Networks Firewall | pa-waw-2 | 000c29e34655-9-1661877591274-27a24 | fw.auth.grant.re | Aug 30 18:39:33 PAN_WAW_SOC_1,2022/08/30 18:39:33,007251000119860,TRAFFIC,drop | not-applicable | any |
| > 2022-08-30 18:39:10 | Palo Alto Networks Firewall | pa-waw-1 | 000c29e34655-9-1661877588000-27a1c | fw.auth.grant.re | Aug 30 18:39:30PAN_WAW_SOC_1,2022/08/30 18:39:30,007251000120207,TRAFFIC,drop | dns | any |
| > 2022-08-30 18:39:10 | Palo Alto Networks Firewall | pa-waw-1 | 000c29e34655-9-1661877591273-27a21 | fw.auth.grant.re | Aug 30 18:39:33 PAN_WAW_SOC_1,2022/08/30 18:39:33,007251000119860,TRAFFIC,end | incomplete | any |
| > 2022-08-30 18:39:10 | Palo Alto Networks Firewall | pa-waw-2 | 000c29e34655-9-1661877588000-27a1d | fw.auth.grant.re | Aug 30 18:39:30 PAN_WAW_SOC_1,2022/08/30 18:39:30,007251000120207,TRAFFIC,end | incomplete | any |
| > 2022-08-30 18:39:09 | Palo Alto Networks Firewall | pa-waw-2 | 000c29e34655-9-1661877591273-27a23 | fw.auth.grant.re | Aug 30 18:39:33 PAN_WAW_SOC_1,2022/08/30 18:39:33,007251000119860,TRAFFIC,end | incomplete | any |
| > 2022-08-30 18:39:08 | Palo Alto Networks Firewall | pa-waw-1 | 000c29e34655-9-1661877591271-27a20 | fw.auth.grant.re | Aug 30 18:39:33 PAN_WAW_SOC_1,2022/08/30 18:39:33,007251000119860,TRAFFIC,drop | not-applicable | any |
| > 2022-08-30 18:39:05 | Palo Alto Networks Firewall | pa-waw-1 | 000c29e34655-9-1661877577233-27a1b | fw.auth.grant.re | Aug 30 18:39:13 PAN_WAW_SOC_1,2022/08/30 18:39:13,007251000119860,TRAFFIC,end | incomplete | any |

AUTOMATED INCIDENT RESPONSE TRACKING AND ENHANCED FRAMEWORK FOR CYBER THREAT ANALYSIS

BACKGROUND

Aspects of the disclosure relate to a cyber threat analysis framework. In some cases, analysts may perform analysis and/or remediating actions with regard to various cyber threats for a given client. In these instances, however, the client might not have access to information describing the analysis and/or remediating actions, and may thus feel disconnected from the remediation process and/or simply be unable to provide feedback on the remediation process. It may be important, accordingly, to grant clients access to this analysis and/or remediation action information.

It may be difficult, however, to obtain the analysis and/or remediation action information without impairing, hindering, and/or otherwise delaying the analysis process (e.g., by prompting an analyst to record this information), which may, e.g., result in decreased efficiency in the cyber threat remediation process and/or increased prevalence/effectiveness of these cyber threats (e.g., resulting from delays to perform the remediation). Accordingly, it may be important to improve the efficiency of such information collection.

SUMMARY

Aspects of the disclosure provide effective, efficient, scalable, and convenient technical solutions that address and overcome the technical problems associated with cyber threat analysis. In accordance with one or more embodiments of the disclosure, a computing platform for generation of an enhanced cyber threat analysis framework may receive, from an enterprise user device, cyber threat investigation information indicating actions performed to address an identified threat for a client through an incident response lifecycle of the identified threat, where the cyber threat investigation information may be collected through a threat framework interface at the enterprise user device configured for automated collection of the cyber threat information in real time as the actions are performed at the enterprise user device. The computing platform may receive (e.g., from a client user device of the client and/or other devices), a request for the cyber threat investigation information. The computing platform may generate, using the cyber threat investigation information, a client interface, which may include a time-series graphical representation of the actions performed to address the identified threat and a play button, where selection of the play button causes automated progression through the time-series graphical representation within the client interface. The computing platform may send, to the client user device, the client interface and one or more commands directing the client user device to cause display of the client interface, which may cause the client user device to cause display of the client interface.

In one or more instances, the automated progression through the time-series graphical representation may include, in response to the selection of the play button: 1) initially displaying one or more events of the incident response lifecycle at one or more initial points in time on the time-series graphical representation; 2) displaying, after displaying the one or more events and at a second point in time on the time-series graphical representation, later than the one or more initial points in time, an alert generated element, indicating that an alert has been generated corresponding to the one or more events; 3) displaying, after displaying the alert generated element and at a third point in time on the time-series graphical representation, later than the second point in time, an information enrichment element, indicating that the one or more events have been enriched with additional threat information; 4) displaying, after displaying the information enrichment element and at a fourth point in time on the time-series graphical representation, later than the third point in time, a pattern matching element, indicating that pattern matching has been performed for the one or more events to identify the actions; 5) displaying, after displaying the pattern matching element and at a fifth point in time on the time-series graphical representation, later than the fourth point in time, a checklist of the actions, wherein the checklist is configured to be dynamically updated in real time as the corresponding actions are completed; 6) displaying, after displaying the checklist and at a sixth point in time on the time-series graphical representation, later than the fifth point in time, a client communication element indicating that the client has been notified of one or more of: the one or more events, the additional threat information, the pattern matching, the actions, and the checklist; and 7) displaying, after the client communication element and at a seventh point in time on the time series graphical representation, later than the sixth point in time, a protective actions element, indicating that one or more of the actions have been completed, wherein the time-series graphical representation is configured to display, to both an analyst of the enterprise user device and the client, a dynamic timeline of the incident response lifecycle from birth of the identified threat to resolution of the identified threat.

In one or more instances, the computing platform may receive, from the client user device, client identification information. The computing platform may identify, based on the client identification information, a corresponding view of the client interface, which may cause the client user device to cause display of the corresponding view of the client interface. In one or more instances, the client identification information may indicate a client type (e.g., client software, identity, asset, device, and/or other information).

In one or more examples, the cyber threat investigation information may include a report, automatically compiled by a background software thread during the incident response lifecycle. In one or more examples, the cyber threat investigation information may be compiled without receipt of user input requesting compilation of the cyber threat investigation information.

In one or more instances, the computing platform may receive, from the enterprise user device, a request to view threat intelligence information. The computing platform may generate, using proprietary intelligence, data aggregation, and scoring algorithms, an analyst interface. The computing platform may send, to the enterprise user device, the analyst interface and one or more commands directing the enterprise user device to display the analyst interface, which may cause the enterprise user device to display the analyst interface, and where the analyst interface may be configured to enable the incident response lifecycle.

In one or more examples, the computing platform may receive, from a second enterprise user device, a second request for the cyber threat investigation information and information indicating that the second enterprise user device is operated by an analyst. The computing platform may identify, based on the information indicating that the second enterprise user device is operated by the analyst, a corresponding view of the analyst interface, different than a view of the analyst interface displayed at the enterprise user device. The computing platform may send, to the second enterprise user device, the analyst interface and one or more commands directing the second enterprise user device to display the analyst interface, which may cause the second enterprise user device to display the corresponding view of the analyst interface. In one or more examples, the computing platform may automatically execute, based on historical cyber threat investigation information corresponding to one or more analysts, one or more actions of the incident response lifecycle.

In one or more instances, the analyst interface may include client identifiers and the corresponding cyber threat investigation information, which may include one or more of: corresponding addresses, domains, users, processes, commands, arguments, behaviors, activities, tactics, techniques, files, and/or other information. In one or more instances, selection of the play button may cause a first portion of the time-series graphical representation to shift off the client interface and a second portion of the time-series graphical representation to shift on to the client interface, where actions represented in the first portion may have occurred prior to actions represented in the second portion.

In one or more examples, generating the client interface may include dynamically updating the client interface in real time throughout the incident response lifecycle, and updating the client interface may include updating the time-series graphical representation. In one or more examples, the computing platform may receive, from the client user device and via the client interface, feedback on the incident response lifecycle. The computing platform may update, based on the feedback, an analyst interface configured to display remaining actions to be performed within the incident response lifecycle. The computing platform may send, to the enterprise user device, the updated analyst interface and one or more commands directing the enterprise user device to display the updated analyst interface, which may cause the enterprise user device to display the updated analyst interface.

In one or more instances, the time-series graphical representation may include one or more of: analyst findings, investigation information, enrichment information of the analyst findings, and events corresponding to the analyst findings.

In accordance with one or more embodiments of the disclosure, a computing platform may install, on the computing platform, incident response documentation software, configured to record actions performed at the computing platform to remediate threats through a plurality of incident response lifecycles. The computing platform may display a graphical user interface including threat intelligence information, which may include one or more actions to be performed by an analyst, corresponding to the computing platform, to address a threat throughout an incident response lifecycle. The computing platform may receive, via the graphical user interface, user input corresponding to the one or more actions. The computing platform may automatically record, using the incident response documentation software, the user input. The computing platform may automatically compile, based on the user input, an incident response log. The computing platform may send, to a central threat framework platform, the incident response log, where one or more additional graphical user interfaces may be generated based on the incident response log.

In one or more instances, automatically recording the user input may include: 1) identifying completion of a particular action of the one or more actions by an analyst operating the computing platform; and 2) storing, by the computing platform and in real time: a) an indication of the completion, b) a timestamp of the completion, and c) results of the completion, where: A) automatically recording the user input avoids manual recordation of the user input by the analyst and makes the user input visible, in real time, to the analyst, other analysts, and a client associated with the threat, and B) the user input includes user input corresponding to one or more of: alert generation actions, information enrichment actions, pattern matching actions, checklist completion actions, client notification actions, and threat remediation actions.

In one or more instances, the incident response documentation software may be further installed at a second computing platform and may be configured to record actions performed at the second computing platform to remediate the threats through a plurality of incident response lifecycles. In one or more instances, the second computing platform may correspond to a second analyst.

In one or more examples, the second computing platform may correspond to a client targeted by the threat. In one or more examples, the incident response log may include second user input, received at the second computing platform, corresponding to the actions performed at the second computing platform.

In one or more instances, the incident response log may include one or more of: the user input, timestamps corresponding to the user input, and an identity of the analyst. In one or more instances, the one or more additional graphical user interfaces may include a time-series graphical representation of the incident response log.

In one or more examples, the computing platform may receive, from the central threat framework platform: the incident response documentation software, and one or more commands directing the computing platform to install the incident response documentation software, where installation of the incident response documentation software may be in response to the one or more commands directing the computing platform to install the incident response documentation software.

In one or more examples, the computing platform may display the one or more additional graphical user interfaces, which may be updated versions of the graphical user interface. In one or more instances, the incident response log may correspond to the incident response lifecycle.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for an enhanced cyber threat analysis framework in accordance with one or more example embodiments;

FIGS. 4-11 depict illustrative graphical user interfaces for an enhanced cyber threat analysis framework in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a software thread that runs in the background of a threat investigator's computer to track the threat work being done and automatically generate reports/logs. This may save the threat investigator time by allowing them to avoid manually preparing a report of a threat investigation after the fact. Furthermore, clients may be able to view these automated reports in real-time to see what is currently and/or has already be done, and when (e.g., the investigations may be logged along with time information). Accordingly, clients might no longer be bystanders of an investigation, but may instead be actively involved and/or aware. Additionally, a unique timeline/graph of the time-series data (e.g., from the birth of a threat to its death) may be generated. A play button may be displayed on the interface, and may initiate animation and/or video, and may cause display of what specific investigation occurred at what time through the incident response lifecycle. Moreover, different views may be available for different user levels/types (e.g., for a client, for training new threat analysts, advanced analyst view, and/or otherwise).

Figure 1A:
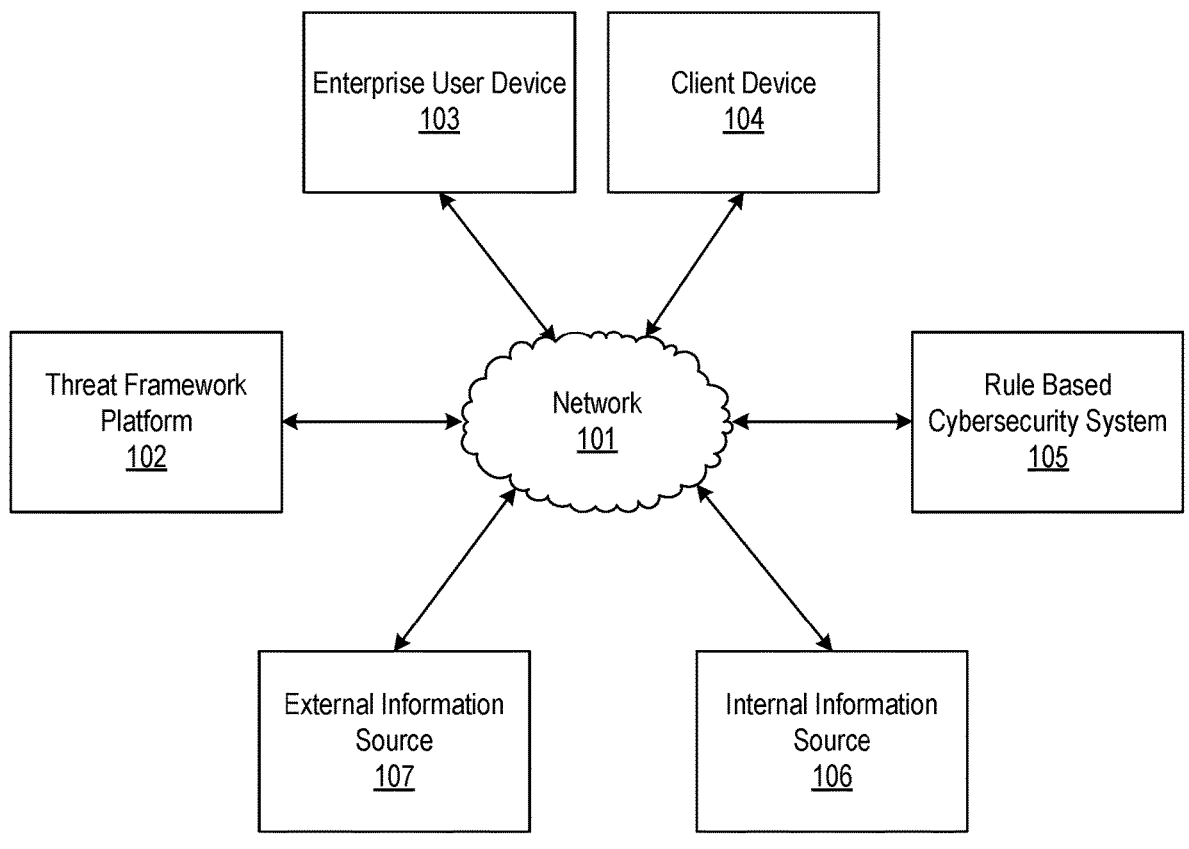
FIGS. 1A-1B depict an illustrative computing environment for an enhanced cyber threat analysis framework in accordance with one or more example embodiments.
Figure 1B:
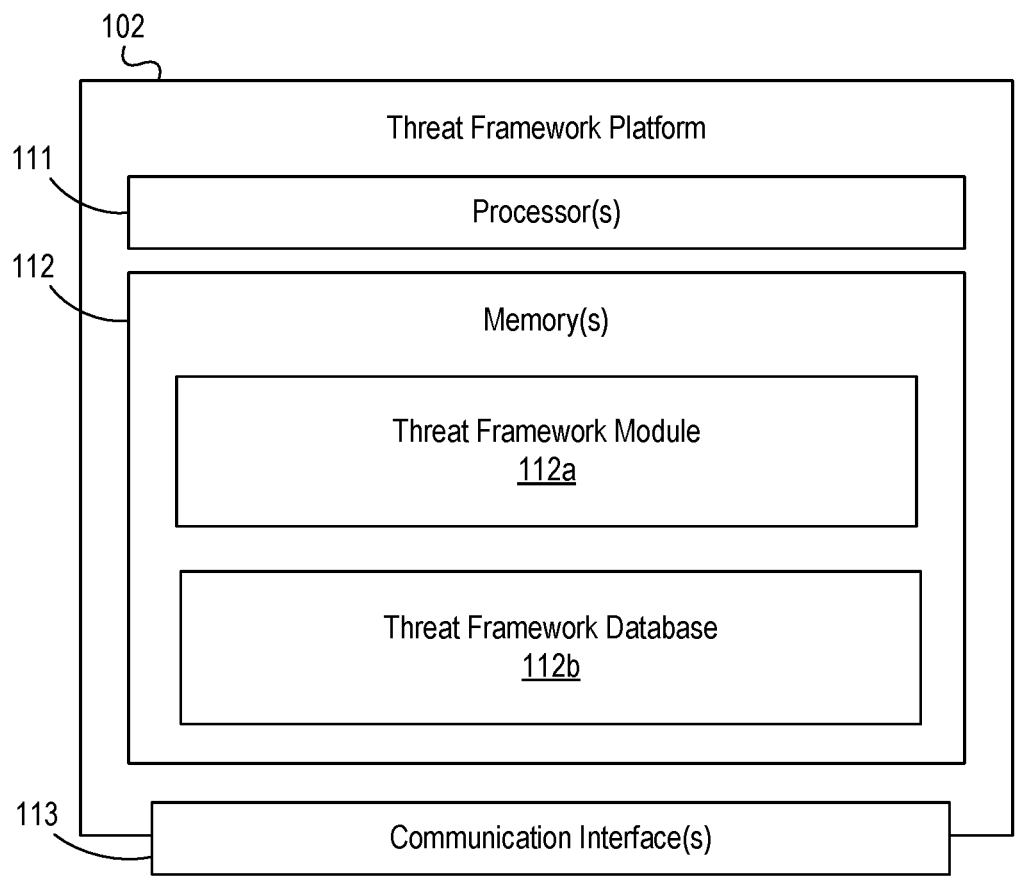

FIGS. 1A-1B depict an illustrative computing environment for an enhanced cyber threat analysis framework in accordance with one or more example embodiments. Referring to FIG. 1A, computing environment 100 may include one or more computer systems. For example, computing environment 100 may include a threat framework platform 102, an enterprise user device 103, client device 104, rule based cybersecurity system 105, internal information source 106, and/or external information source 107.

As described further below, threat framework platform 102 may be a computer system that includes one or more computing devices (e.g., servers, server blades, or the like) and/or other computer components (e.g., processors, memories, communication interfaces) that may be used to monitor one or more computing systems (e.g., rule based cyber security system 105, internal information source 106, external information source 107, and/or other systems) to collect cyber security information. The threat framework platform 102 may further be configured to generate one or more interfaces to display this cyber security information to both enterprise employees and clients.

Enterprise user device 103 may be a mobile device, tablet, smartphone, desktop computer, laptop computer, and/or other device that may be used by an individual (such as a cybersecurity professional) to monitor network security, perform threat investigations, and/or perform other actions. In some instances, the enterprise user device 103 may be configured with a background software thread that may be configured to record and/or otherwise document actions and/or other interactions from a user of the enterprise user device 103 through an incident response lifecycle. In some instances, the enterprise user device 103 may be configured to provide one or more user interfaces (e.g., analyst interfaces including cyber security information, actions to be performed, results of a threat investigation, timelines, animations, or the like).

Client device 104 may be a mobile device, tablet, smartphone, desktop computer, laptop computer, and/or other device that may be used by an individual (such as a client of a cybersecurity company) to access a status of their personalized cybersecurity analysis, communicate with the cybersecurity company, and/or perform other actions. In some instances, the enterprise user device 103 may be configured to provide one or more user interfaces (e.g., client interfaces including cyber security information, actions performed by a cybersecurity analyst, results of a threat investigation, animations, timelines or the like).

Rule based cybersecurity system 105 may be a computer system that includes one or more computing devices (e.g., servers, server blades, or the like) and/or other computer components (e.g., processors, memories, communication interfaces) that may be used to analyze metadata/attributes (e.g., IP address, domain, hash, indicators of compromise, command line, and/or other metadata) and classify domains with proprietary threat intelligence and/or otherwise. Although rule based cybersecurity system 105 is depicted as a distinct system, different than the threat framework platform 102, in some instances, rule based cybersecurity system 105 may be incorporated with or otherwise integrated into the threat framework platform 102 without departing from the scope of the disclosure.

Internal information source 106 may be a computer system that includes one or more computing devices (e.g., servers, server blades, or the like) and/or other computer components (e.g., processors, memories, communication interfaces) that may be used to store information that may be used for threat identification and/or resolution. In some instances, the internal information source 106 may store information that may be proprietary and/or otherwise controlled by an enterprise organization corresponding to the threat framework platform 102.

External information source 107 may be a computer system that includes one or more computing devices (e.g., servers, server blades, or the like) and/or other computer components (e.g., processors, memories, communication interfaces) that may be used to store information that may be used for threat identification and/or resolution. In some instances, the internal information source 107 may store information controlled by one or more third party vendors and/or corresponding to open source intelligence. For example, the external information source 107 may be configured to store one or more of endpoint detection and response (EDR) information, operating system (OS) logs, firewall/network logs, application logs, cloud environment security alerts, and/or other information.

Computing environment 100 also may include one or more networks, which may interconnect threat framework platform 102, enterprise user device 103, client device 104, rule based cybersecurity system 105, internal information source 106, external information source 107, or the like. For example, computing environment 100 may include a network 101 (which may interconnect, e.g., threat framework platform 102, enterprise user device 103, client device 104, rule based cybersecurity system 105, internal information source 106, external information source 107, or the like).

In one or more arrangements, threat framework platform 102, enterprise user device 103, client device 104, rule based cybersecurity system 105, internal information source 106, and/or external information source 107 may be any type of computing device capable of sending and/or receiving requests and processing the requests accordingly. For example, threat framework platform 102, enterprise user device 103, client device 104, rule based cybersecurity system 105, internal information source 106, external information source 107, and/or the other systems included in computing environment 100 may, in some instances, be and/or include server computers, desktop computers, laptop computers, tablet computers, smart phones, or the like that may include one or more processors, memories, communication interfaces, storage devices, software, and/or other components. As noted above, and as illustrated in greater detail below, any and/or all of threat framework platform 102, enterprise user device 103, client device 104, rule based cybersecurity system 105, internal information source 106, external information source 107, or the like may, in some instances, be special-purpose computing devices configured to perform specific functions.

Referring to FIG. 1B, threat framework platform 102 may include one or more processors 111, memory 112, and communication interface 113. A data bus may interconnect processor 111, memory 112, and communication interface 113. Communication interface 113 may be a network interface configured to support communication between threat framework platform 102 and one or more networks (e.g., network 101, or the like). Memory 112 may include one or more program modules having instructions that when executed by processor 111 cause the systems of the threat framework platform 102 to perform one or more functions described herein and/or one or more databases that may store and/or otherwise maintain information which may be used by such program modules and/or processor 111. In some instances, the one or more program modules and/or databases may be stored by and/or maintained in different memory units of threat framework platform 102 and/or by different computing devices that may form and/or otherwise make up threat framework platform 102. For example, memory 112 may have, host, store, and/or include threat framework module 112a and threat framework database 112b.

Threat framework module 112a may have instructions that direct and/or cause threat framework platform 102 to execute advanced techniques to proactively monitor cyber security information and/or activity at enterprise computing devices, and generate interfaces accordingly. TTP based threat analysis database 112b may store information used by the threat framework module 112a and/or threat framework platform 102 in application of advanced techniques to monitor cyber security information and/or activity at enterprise computing devices, and generate interfaces accordingly, and/or in performing other functions.

Figure 2A:
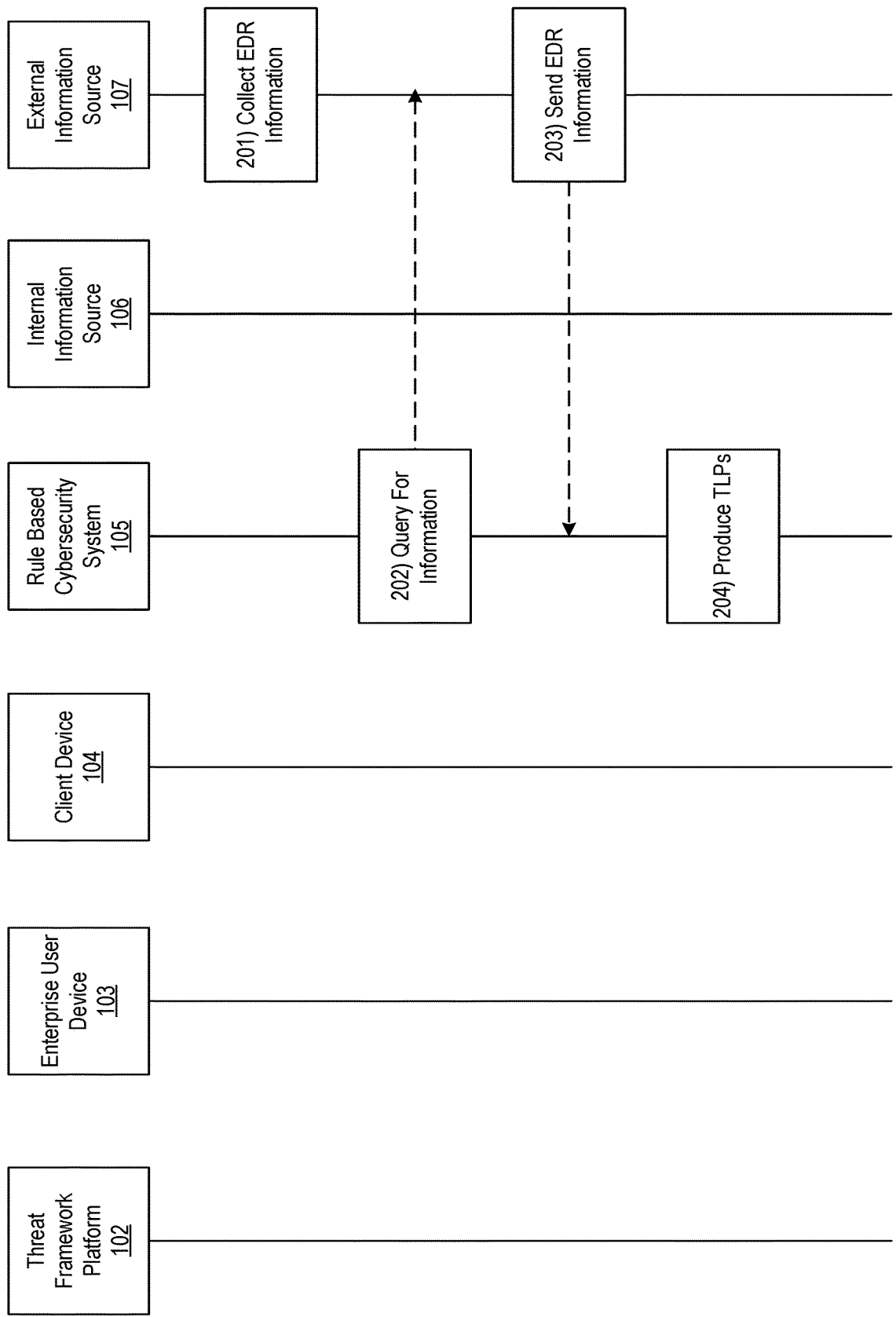

FIGS. 2A-2D depict an illustrative event sequence for an enhanced cyber threat analysis framework in accordance with one or more example embodiments. Referring to FIG. 2A, at step 201, the external information source 107 may collect and store EDR information from a number of different endpoints. In some instances, the external information source 107 may continuously collect this EDR information, which may, e.g., be illustrative/indicative of the various tactics, techniques, and/or procedures (TTP) performed by malicious actors to commit execute a cyber security attack/threat, indicators of compromise (IOCs), and/or other information.

At step 202, the rule based cybersecurity system 105 may query the external information source 107 for EDR information. For example, the rule based cybersecurity system 105 may send an application programming interface (API) request that includes a query for logs, events, security information, behaviors, asset attributes, and/or other information that may be used to indicate TTP and/or IOC information corresponding to a particular threat investigation, which may, for example, include investigating for any threats associated with one or more clients.

In some instances, the rule based cybersecurity system 105 may send the API request(s) including the one or more queries for EDR information to a plurality of EDR systems. For example, in some instances, the queries may be configured to request the EDR information, corresponding to a given TTP and/or IOC, from multiple different vendors/technologies.

In some instances, in querying the external information source 107, the rule based cybersecurity system 105 may use an API, configured to communicate with the external information source 107, to send the queries from the configuration file(s). In some instances, in querying the external information source 107, the rule based cybersecurity system 105 may query multiple systems asynchronously so as to more efficiently analyze EDR information for the corresponding clients (e.g., rather than processing one at time).

At step 203, the external information source 107 may send the requested EDR information. For example, in some instances, the external information source 107 may compile comma-separated values (CSV) files corresponding to each TTP, IOC, vendor, and/or technology for which EDR information was requested at step 202, which may, in some instances, include metadata/attributes (e.g., IP address, hash, URL, domain, indicator of compromise, command line, and/or other metadata/attributes). In these instances, the external information source 107 may return the CSV files to the rule based cybersecurity system 105. In some instances, the CSV files may include information such as timestamps, device identifiers, device names, action types, remote IP, remote port, remote URL, local IP, local port, protocol, local IP type, remote IP type, and/or other information. In some instances, the external information source 107 may similarly store and provide additional information such as server log information, network traffic information, time-series data, and/or other information.

At step 204, the rule based cybersecurity system 105 may produce a threat score and aggregated intel for the domains corresponding to the EDR information received at step 203. For example, the rule based cybersecurity system 105 may train, host, and/or otherwise maintain a machine learning model configured to input the EDR information and to output corresponding aggregated threat and operational intelligence. For example, the rule based cybersecurity system 105 may input the metadata/attributes from the queries into the model to output a result of "malicious," "possibly malicious," "not malicious," or some similar classification (e.g., a maliciousness score, threat classification, or the like), and may assign a threat score accordingly (e.g., a color or icon indicating likelihood of maliciousness (e.g., red, yellow, green, etc.). In some instances, the model may output this threat score information based on comparison of the metadata/attributes to metadata/attributes lists (e.g., whitelists, blacklists, etc.), which may, e.g., be used to train the model, and/or based on other data corresponding to the metadata/attributes (which may, e.g., be internally produced and/or received from third party vendors, and used to train the model).

In some instances, the response protocol (RP) and/or response authorization (RA) may indicate, to a cybersecurity analyst, how they may respond to a given threat. For example, a "red" RP may indicate that a client's authorization is needed to perform various mitigating actions. A "yellow" RP may indicate that a limited set of mitigating actions are available that do not require client authorization, whereas other actions do require client authorization. A "green" RP may indicate that any actions are available to the analyst without authorization needed from the client. Additionally or alternatively, the RP may indicate the client risk tolerance corresponding to the associated host. For example, a "high" threat score may require an analyst to review information associated with a corresponding file, address, domain. In these instances, the threat score may prompt a processing system (e.g., such as the threat framework platform 102) to pull historical information for the corresponding file, address, domain, and/or other information, and provide that to an analyst (e.g., by way of the analyst interface discussed further below). A "moderate" threat score may indicate a medium threat (e.g., a particular host has been seen a few times in the past and a few unwanted/malicious hits are associated with it). A "green" threat score may indicate that no actions are needed as no threat has been identified.

In some instances, the threat score may be dynamically and/or subsequently modified by the rule based cybersecurity system 105 and/or the threat framework platform 102 based on new information, changing conditions, feedback, and/or otherwise. For example, based on this information, the threat score may be modified from "red" to "yellow," or the like. By tagging hosts with the learned investigative and/or operational information, both computing and human resources may be conserved by limiting further analysis of a host to only those identified as being worth further investigation (e.g., due to an associated threat).

Figure 2B:
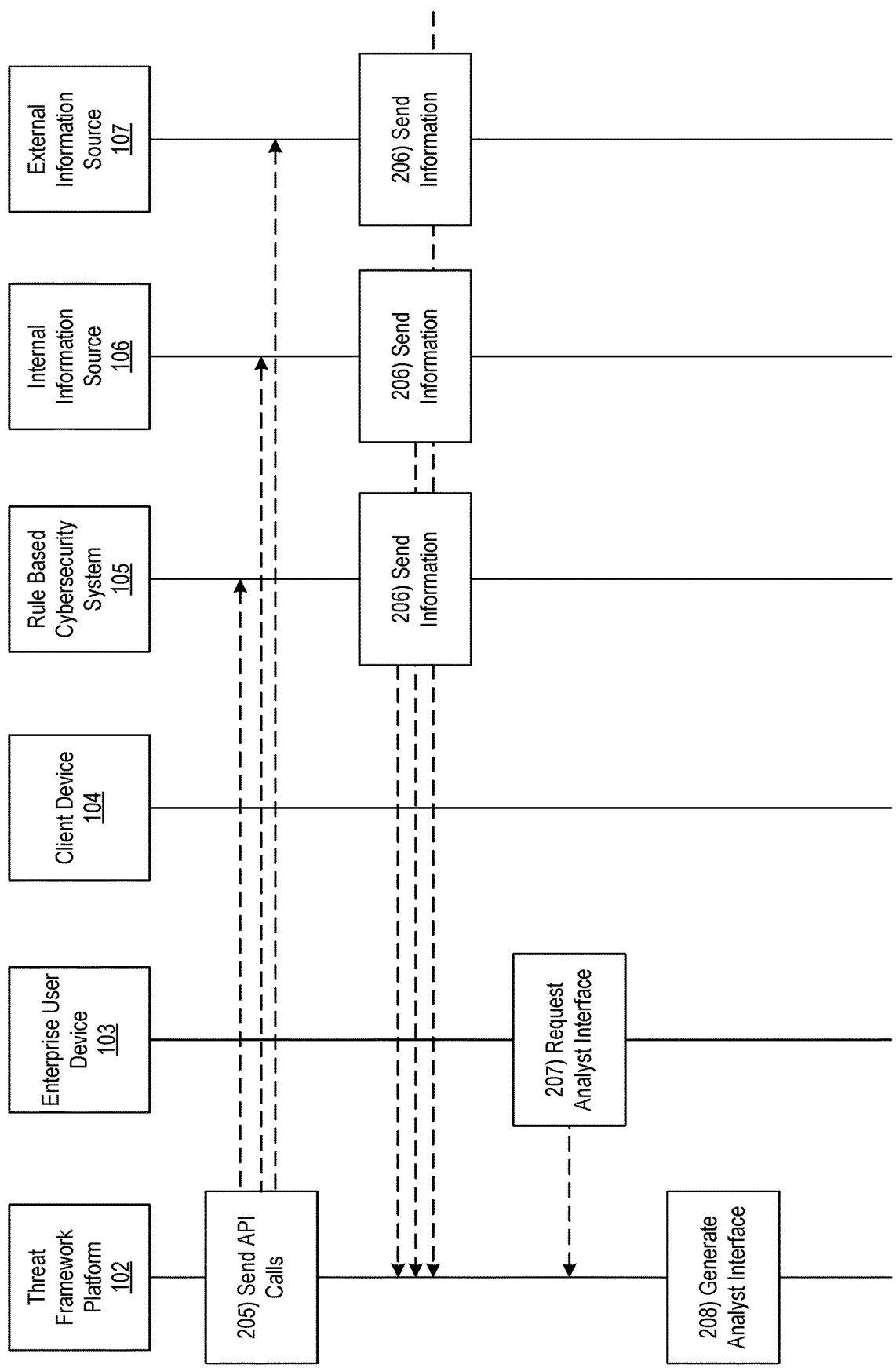

Referring to FIG. 2B, at step 205, the threat framework platform 102 may send one or more API calls requesting information that may be used to produce threat framework interfaces (e.g., for display to analysts, clients, and/or other individuals). For example, although the transmission of EDR information is described above at steps 201-204, this is for illustrative purposes only, and any other internal and/or external information may be requested without departing from the scope of the disclosure. For example, the threat framework platform 102 may send the one or more API calls to the rule based cybersecurity system 105 (e.g., requesting enrichment or contextual information), the internal information source (e.g., requesting any internal threat intelligence information), the external information source 107 (e.g., requesting any third party and/or otherwise external threat intelligence information), and/or other computing systems to obtain contextual information on various threats for various clients. In some instances, the threat framework platform 102 may send the API calls via the communication interface 113 and while wired and/or wireless data connections are established with these various systems.

At step 206, the rule based cybersecurity system 105, internal information source 106, external information source 107, and/or other systems may send the requested information to the threat framework platform 102. For example, the rule based cybersecurity system 105 may send the RA information, the internal information source 106 may send internally produced or stored threat intelligence information, the external information source 107 may send externally produced and/or stored threat intelligence information (e.g., operating system (OS) logs, firewall/network logs, application logs, cloud environment security alerts, and/or other information), and/or other systems may send other information. In some instances, the rule based cybersecurity system 105, internal information source 106, external information source 107 and/or other systems may send the above described information while wired and/or wireless connections are established between these systems and the threat framework platform 102.

In some instances, the threat framework platform 102 may store this information (e.g., in some instances, for a period of time relative to a given investigation). In doing so, the threat framework platform 102 may effectively pull data from a number of large sources (e.g., a data lake) into a smaller data store (e.g., a data pond). This may avoid a need to reobtain such data throughout the incident response lifecycle for the investigation, and until an event is resolved.

At step 207, the enterprise user device 103 may send a request to the threat framework platform 102 to view an analyst interface. For example, the enterprise user device 103 may receive user input from a user (e.g., a cybersecurity analyst, or the like) requesting threat intelligence information (e.g., information indicating cybersecurity threats, attacks, information, tasks to be performed, and/or other information). In some instances, the enterprise user device 103 may also send analyst identification information, which may e.g., identify the analyst of the enterprise user device 103, provide a job title and/or experience level for the analyst (e.g., senior analyst versus analyst in training), distinguish the analyst from a client, and/or provide other information. In some instances, the enterprise user device 103 may send the request for the analyst interface while a wired and/or wireless data connection is established with the threat framework platform 102.

At step 208, the threat framework platform 102 may generate an analyst interface that includes information that may, e.g., assist a user of the enterprise user device 103 with addressing cyber threats, attacks, and/or otherwise providing cybersecurity services. For example, the threat framework platform 102 may generate the analyst interface using the RP/RA information, internal threat intelligence information, external threat intelligence information, and/or other information received at step 206. For example, the analyst interface may include addresses, domains, users, processes, files, and/or other information corresponding to a given client or threat. In doing so, a cybersecurity interface may be generated that aggregates cyber threat and/or remediation information in a way that tells a story to a corresponding analyst. For example, the analyst interface may be generated to include events, detections, an analytical cycle, an incident response cycle, and/or other enrichment of this data. In some instances, the threat framework platform 102 may generate the analyst interface based on the client identification information. For example, the threat framework platform 102 may, in some instances, generate different analyst interfaces for analysts in training than for senior analysts. In some instances, a single analyst interface may be generated, and different views of the analyst interface may be sent to analysts of different experience levels, with different job titles, or the like. In some instances, the threat framework platform 102 may modify the RA/RP information based on the internal threat intelligence information and/or external threat intelligence information received by the threat framework platform 102, which might not have been used by the rule based cybersecurity system 105 to initially identify the RA/RP information. In doing so, the threat framework platform 102 may provide a more accurate RA/RP for a given host/threat than would be assigned by an analyst or the rule based cybersecurity system 105 alone, which might not take into account this additional information. In these instances, the threat framework platform 102 may include the updated RA/RP information on the analyst interface.

In some instances, the analyst interface may include actions to be performed by an analyst at the enterprise user device 103, which may, in some instances, be prioritized based on criticality of the action, analyst skills, analyst preferences, and/or other information. In doing so, rather than the analyst themselves simply selecting a task that may, in some instances, be easiest to perform at a given time, a distinct order of tasks may be provided to the analyst. In some instances, a machine learning or other model may be used to select optimal analysts to perform various actions and/or optimal tasks for a given analyst to perform (e.g., based on analyst skills, preferences, and/or other information. In these instances, optimal may refer to completion in the shortest amount of time, with above a threshold level of likelihood of success (e.g., successfully completing the action).

In some instances, in generating the analyst interface, the threat framework platform 102 may generate an interface that includes individual threat events driven by the data received at step 206. In some instances, the analyst interface may also have detection information, including events that may have context and/or other logic applied to them, an indication that an event is worthy of human review (and/or further automated analysis), and/or other information. In some instances, the interface may indicate how discrete elements such as addresses, files, domains, processers, users, and/or other elements are related to each other over time. For example, the analyst interface may include a time-series plot that may be used to visualize such relationships (which may, e.g., be shared with clients as described below with regard to the client interface, so as to facilitate explanation and/or otherwise illustrate an incident response lifecycle to the client). An example of this graph is shown in graphical user interface 605 of FIG. 6.

Although generation of the analyst interface is described at step 208, the analyst interface may be dynamically and continuously updated (e.g., as described below with regard to the client feedback) without departing from the scope of the disclosure. For example, updated versions of the client interface may be continuously and/or otherwise generated. Furthermore, generation of the analyst interface may, in some instances, include any of the actions/features described below with regard to generation of the client interface without departing from the scope of the disclosure.

Figure 2C:
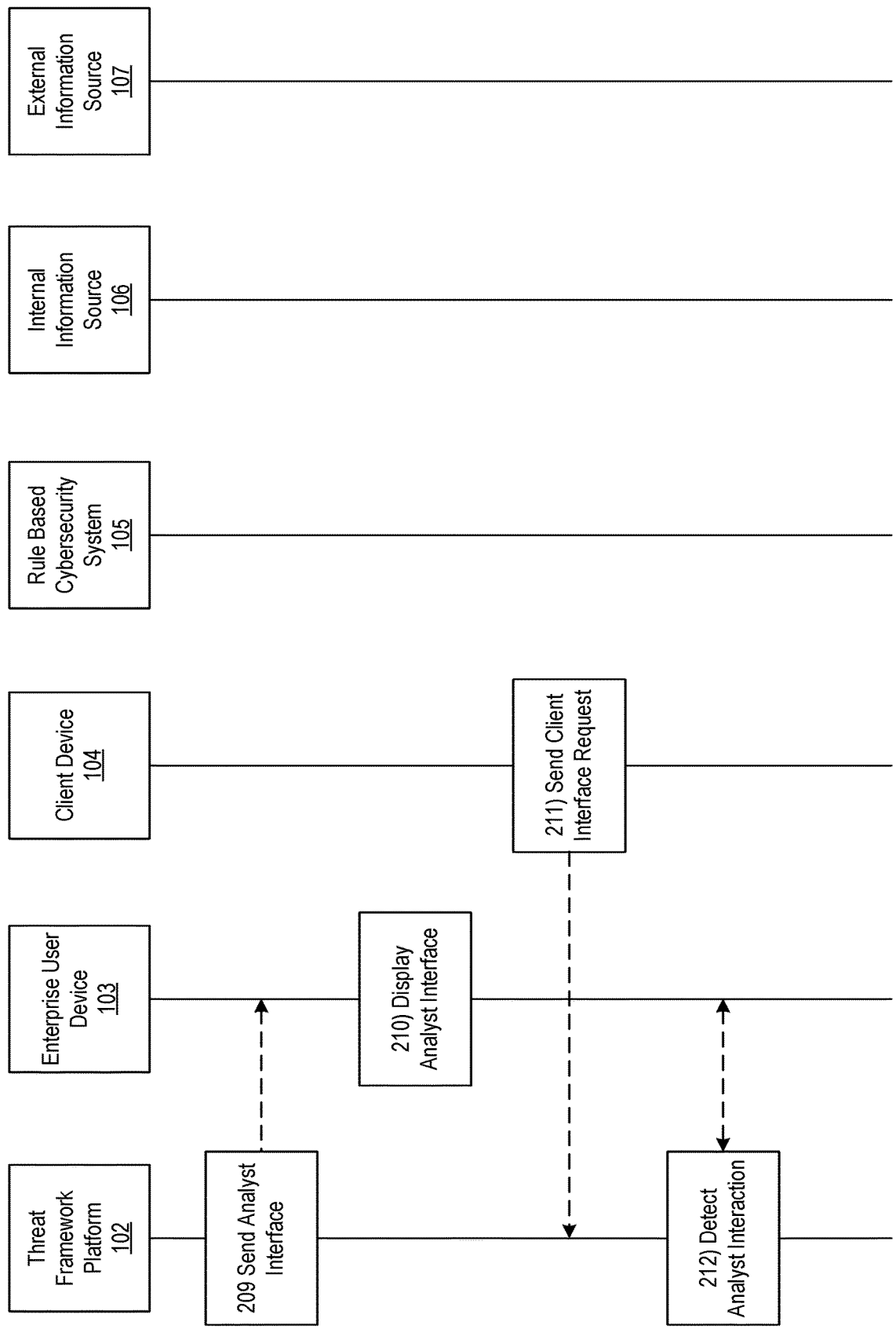

Referring to FIG. 2C, at step 209, the threat framework platform 102 may send the analyst interface, generated at step 208, to the enterprise user device 103. In some instances, the threat framework platform 102 may also send one or more commands directing the enterprise user device 103 to display the analyst interface. In some instances, the threat framework platform 102 may send the analyst interface to the enterprise user device 103 via the communication interface 113 and while a wired or wireless data connection is established with the enterprise user device 103.

Figure 4:
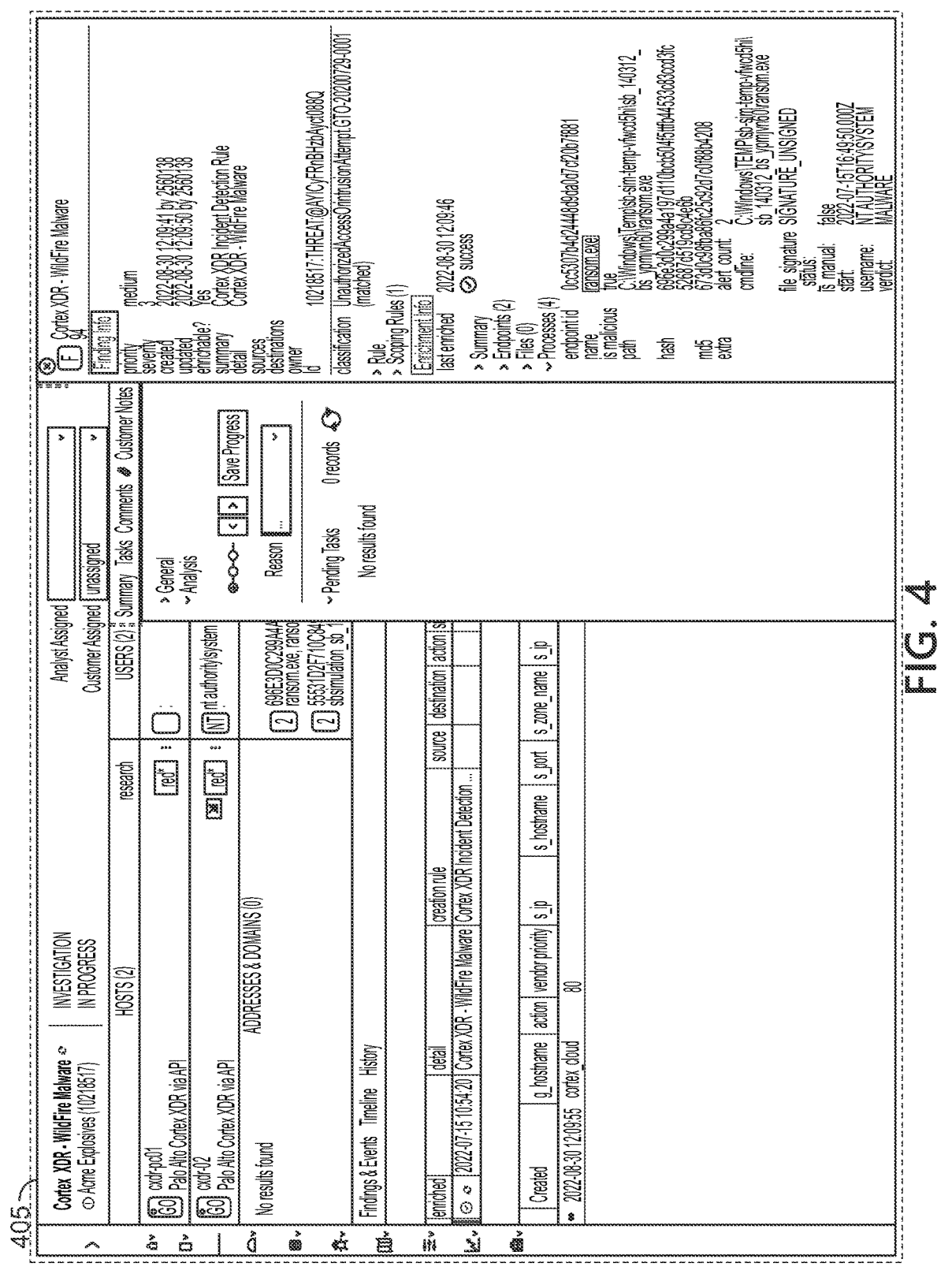
Figure 5:
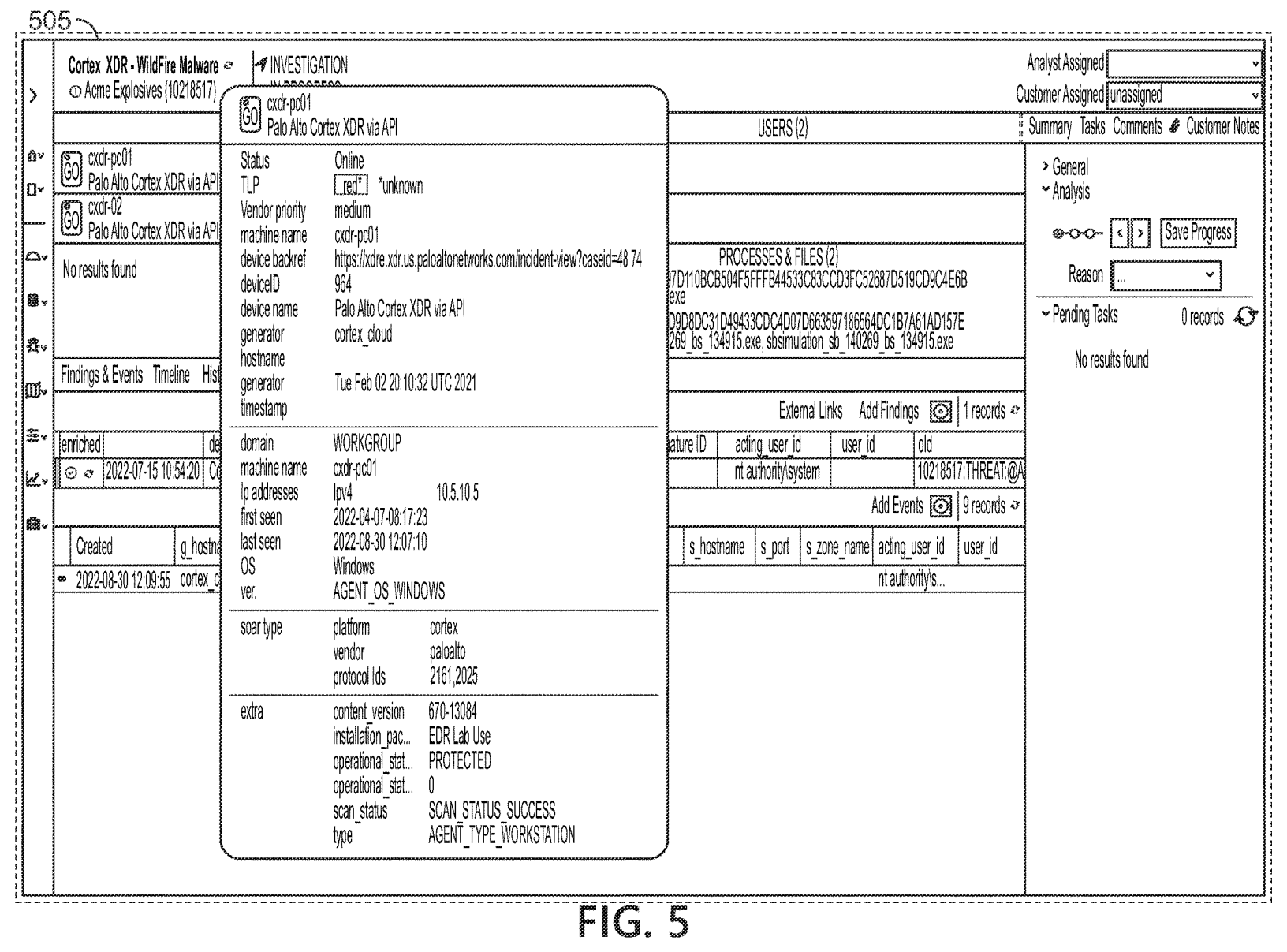
Figure 6:
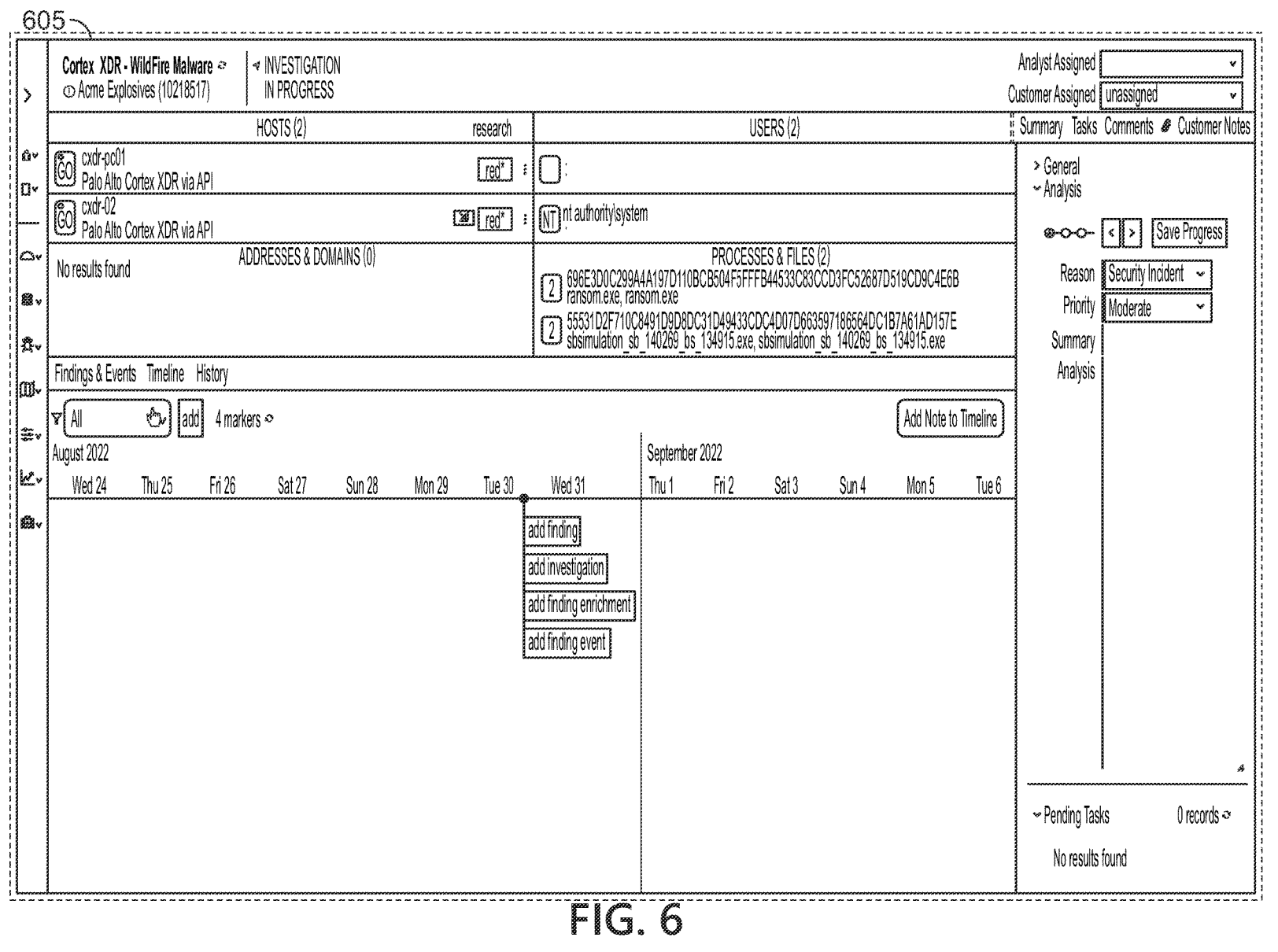
Figure 7:
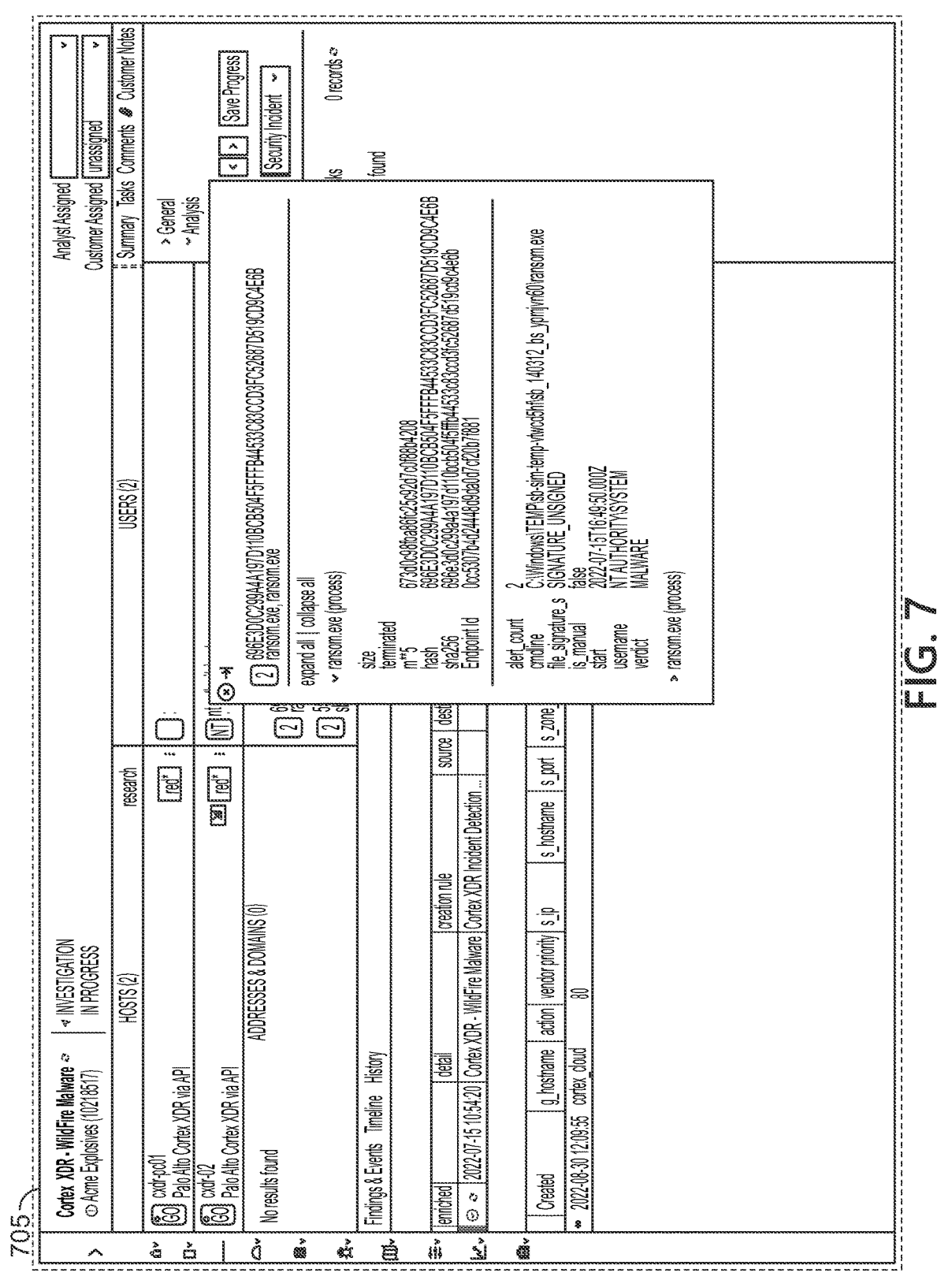

At step 210, based on or in response to the one or more commands directing the enterprise user device 103 to display the analyst interface, the enterprise user device 103 may display the analyst interface. For example, the enterprise user device 103 may display a graphical user interface similar to graphical user interface 405, which is shown in FIG. 4. For example, the user interface may include threat intelligence information such as addresses, domains, users, processes, files, findings, events, pending tasks, and/or other information corresponding to clients and/or threats. Furthermore, in some instances, the analyst interface may include one or more selectable elements, which may cause the enterprise user device 103 to display additional information, as shown in graphical user interface 505, which is shown in FIG. 5. For example, the analyst interface may display threat intelligence information such as status, RA/RP, vendor priority, machine name, device reference, deviceID, device name, generator hostname, generator timestamp, domain, machine name, IP addresses, first seen information, last seen information, operating system, operating system version, security orchestration, automation, and response (SOAR) type, content version, and/or other information for a given host/asset. In some instances, as the analyst scrolls, clicks, and/or otherwise interacts with elements of the user interface, additional information may be displayed (e.g., as shown in graphical user interface 705 of FIG. 7). For example, if the analyst selects a particular process, additional information such as size, endpoint ID, alert count, command line, file signature status, username, malware verdict, and/or other information for the selected process may be displayed. In some instances, display of the analyst interface may enable an incident response lifecycle, which may, e.g., display threats and corresponding remediating actions, which may be used to mitigate or otherwise eliminate the threats. In some instances, only hosts with a particular RA/RP may be included on the analyst interface (e.g., red or yellow, but not green). In some instances, the analyst interface, as depicted in FIGS. 5 and 6, may be on a per client basis. For example, different analyst interfaces may be generated/displayed for a single analyst, each corresponding to a different client.

At step 211, the client device 104 may send a request to access cyber threat investigation information (e.g., indicating actions being taken throughout an incident response lifecycle to address threats, attacks, and/or other issues corresponding to the client device 104). For example, the client device 104 may request to view a client interface to the threat framework platform 102. For example, the client device 104 may request an interface that indicates progress of threat remediation and/or other information for the client (which may, e.g., enable the client to actively monitor progress of one or more analysts providing services for the given client). In some instances, the client device 104 may also send client identification information, which may, e.g., enable the threat framework platform 102 to identify the corresponding client and/or otherwise distinguish between clients and analysts, provide a client type (e.g., corporate client, personal client, and/or other information), and/or include other information. In some instances, the client device 104 may send the request for the client interface while a wired or wireless data connection is established with the threat framework platform 102.

At step 212, the threat framework platform 102 may detect interactions (e.g., user input and/or otherwise) between the analyst and the enterprise user device 103 (e.g., with the analyst interface). For example, the threat framework platform 102 may monitor the enterprise user device 103 to detect cyber threat investigation information indicating actions being taken (e.g., throughout an incident response lifecycle) to address threats, attacks, and/or other issues corresponding to the client device 104. For example, it may be assumed that in this instance, an analyst corresponding to the enterprise user device 103 may have been tasked with addressing one or more threats for the client of the client device 104. In some instances, the threat framework platform 102 may continuously and dynamically monitor the enterprise user device 103. In other instances, the threat framework platform 102 may wait until a request is received from the client device 104 to initiate the detection. In some instances, the analyst interface may be configured for automated collection of interaction information in real time as actions are performed at the enterprise user device 103.

For example, in detecting these interactions, actions, inputs, clicks, and/or other interactions from the analyst in addressing a particular threat may be recorded and compiled into a time-series graph (e.g., as shown in FIG. 6) depicting an incident response lifecycle for the threat comprising an animated lifecycle of the threat from its birth to its resolution.

In some instances, detecting the interactions at the enterprise user device 103 may include receiving a report, from the enterprise user device 103, automatically compiled (e.g., without receipt of user input requesting the compilation) by a background software thread (which may, e.g., be configured to record and/or otherwise document incident response lifecycles) executing on the enterprise user device 103 (e.g., throughout the incident response lifecycle). In some instances, this background software thread may be configured to cause interactions between the enterprise user device 103 and one or more servers (e.g., threat framework platform 102, rule based cybersecurity system 105, internal information source 106, external information source 107, and/or other systems) to be recorded. For example, the enterprise user device 103, threat framework platform 102, external information source 107, and/or other systems may automatically record, using the background software thread and based on identifying completion of one or more actions performed by the analyst using the enterprise user device 103, user input corresponding to the actions performed to address the particular threat during the incident response lifecycle (e.g., generation actions, information enrichment actions, pattern matching actions, checklist completion actions, client notification actions, threat remediation actions, and/or other actions) (e.g., along with an indication of completion of the action, a timestamp of the completion, results of the completion, and/or otherwise), and may automatically compile an incident response log based on the user input. By automatically performing this documentation/recording, manual recordation of the user input by the analyst may be avoided, and the user input may be made visible, in real time, to the analyst, other analysts, the client, and/or other individuals In some instances, this background software thread may be automatically pushed to the enterprise user device 103 (e.g., by the threat framework platform 102 or other computing device) and/or otherwise installed at the enterprise user device 103 prior to use of the enterprise user device 103 to perform any threat remediation actions in the incident response lifecycle. For example, the background software thread may be installed at the enterprise user device 103 upon initial registration of the enterprise user device 103 with an organization corresponding to the threat framework platform 102. In some instances, the background software thread may be pushed to the enterprise user device 103 from the threat framework platform 102, along with one or more commands directing the enterprise user device 103 to install the background software thread. In these instances, the enterprise user device 103 may install the background software thread based on or in response to receiving the one or more commands directing the enterprise user device 103 to install the background software thread. In instances where the incident response log is generated by the enterprise user device 103, the enterprise user device 103 may send the incident response log to the threat framework platform 102. In some instances, the threat framework platform 102 may detect the interaction information and/or otherwise receive the incident response log via the communication interface 113 and while a wired or wireless data connection is established with the enterprise user device 103.

Figure 8B:
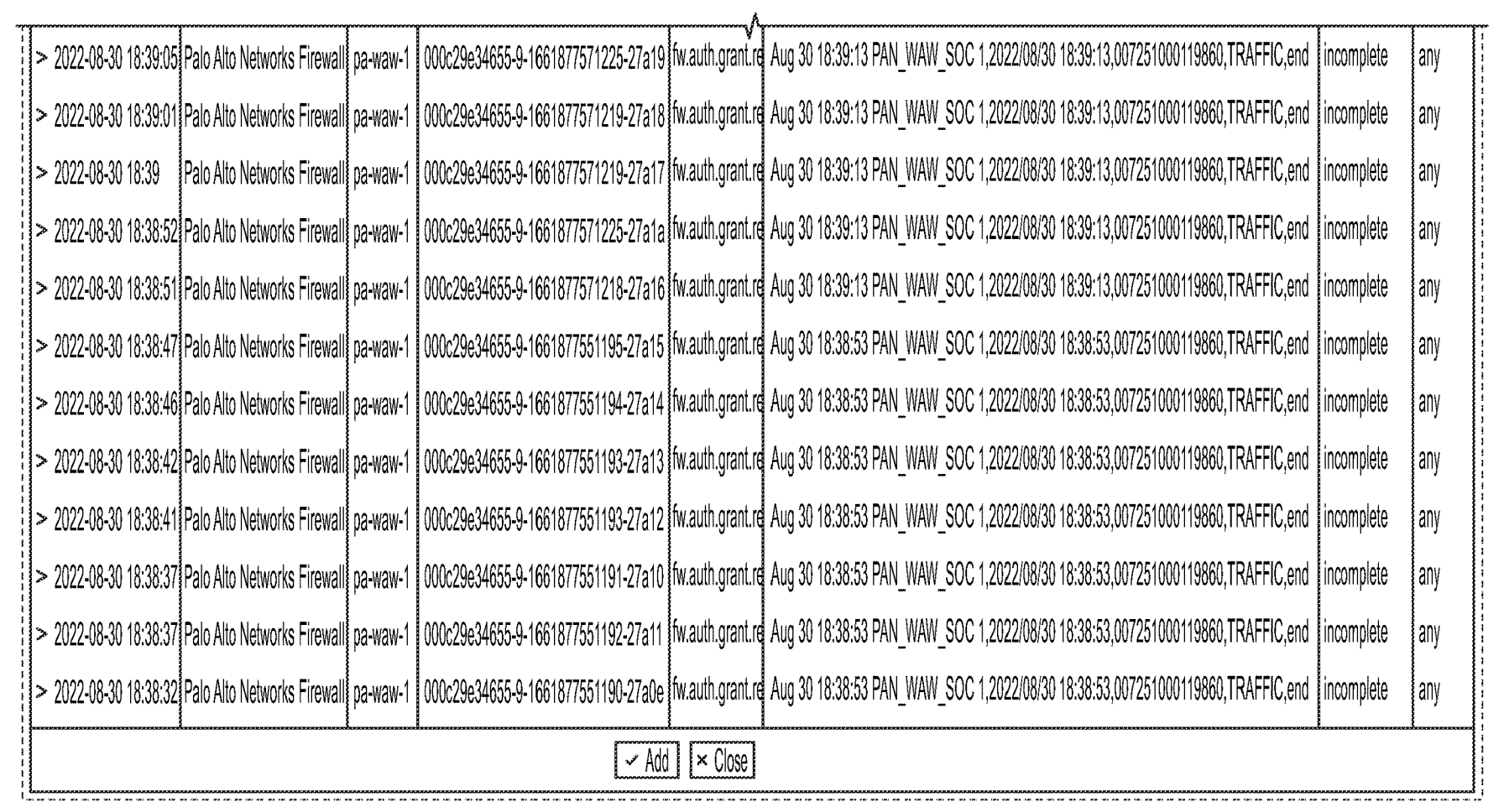
Figure 9:
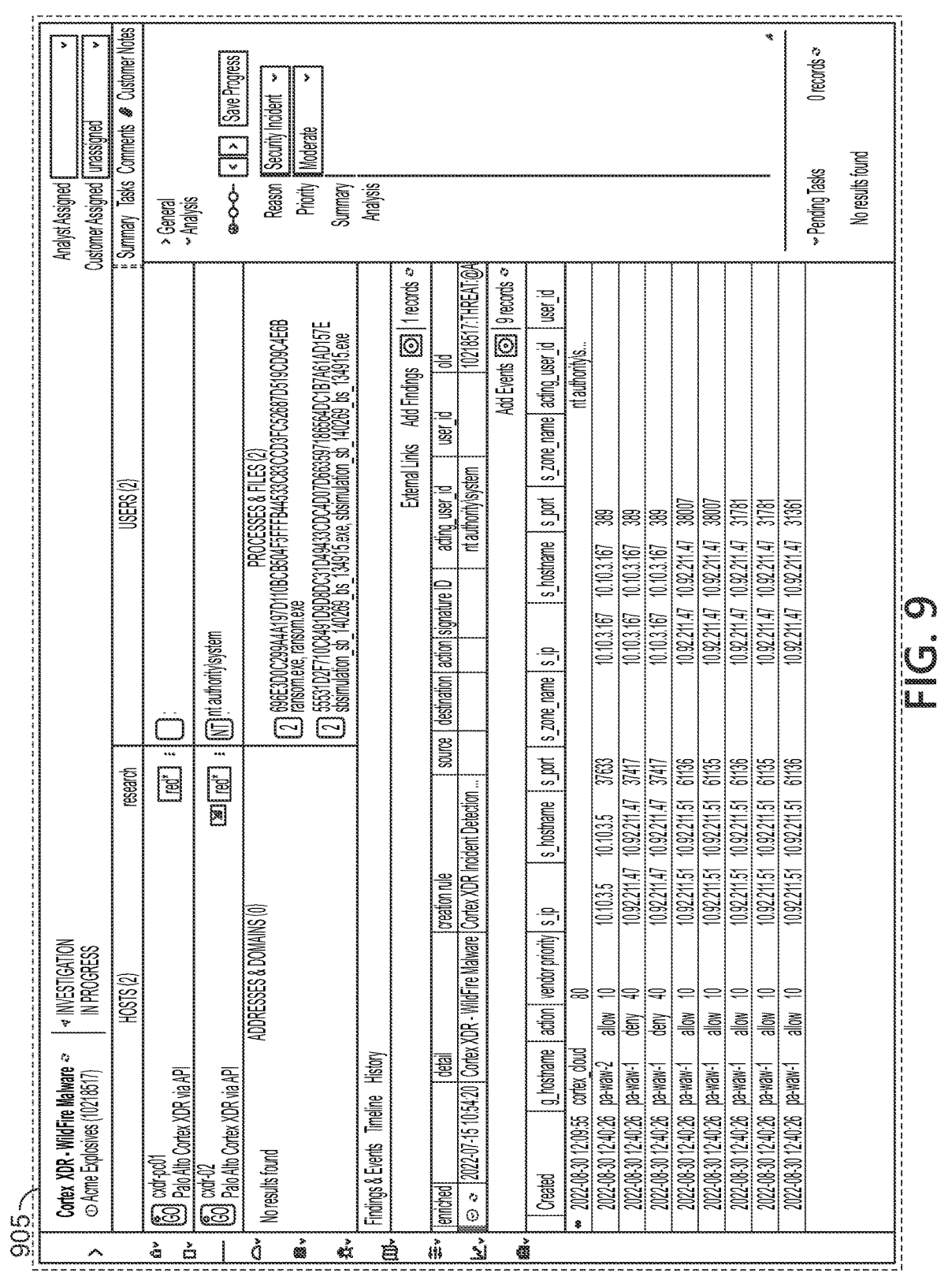
Figure 10:
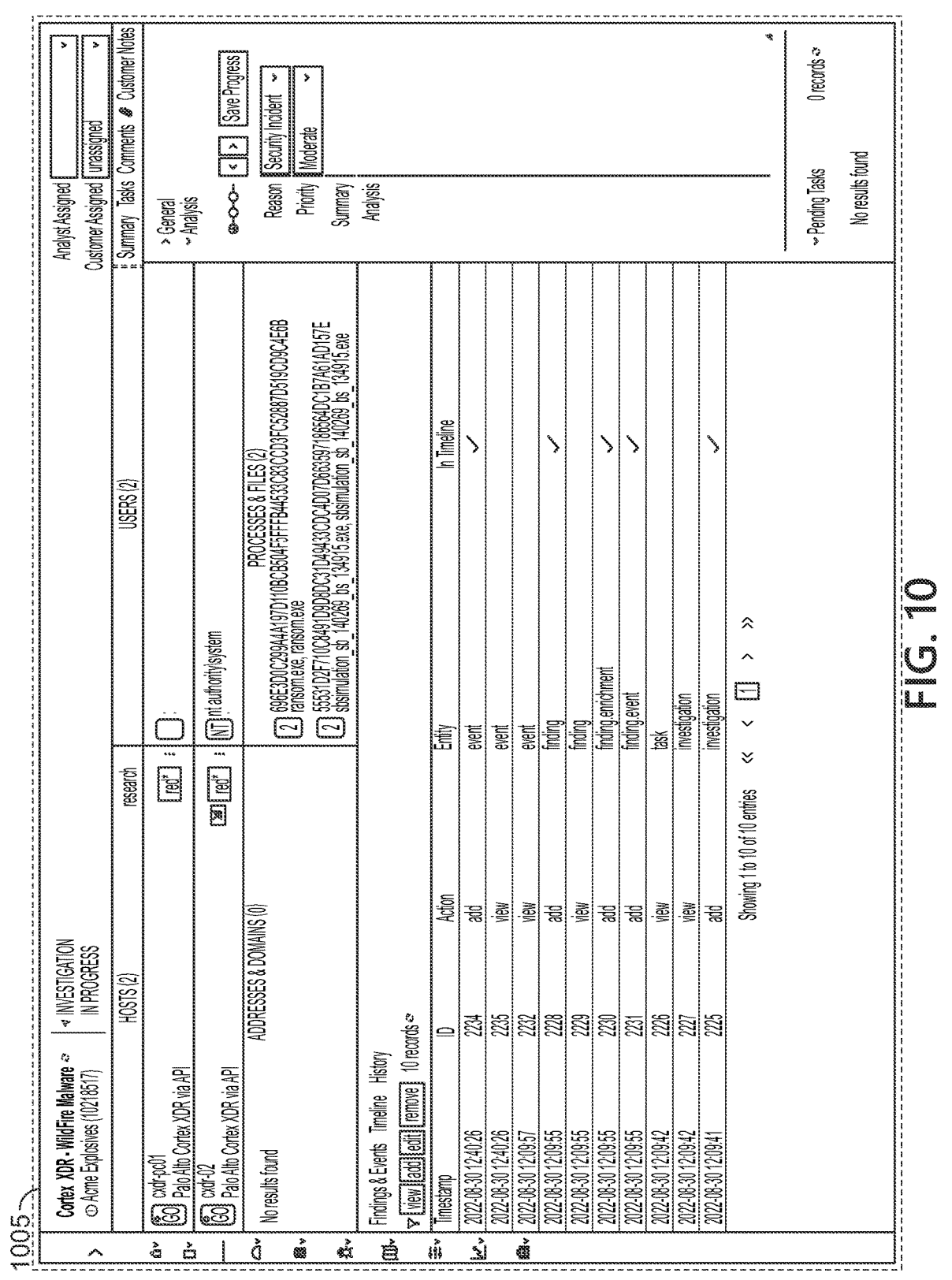

As a particular example, the analyst may search (and/or a computing system may automatically search) for an IP address and identify a number of corresponding findings/events (e.g., as shown in graphical user interface 805 of FIGS. 8A-8B). In some instances, these findings/events may be used to enrich a particular investigation (e.g., as shown in graphical user interface 905 of FIG. 9). This enrichment information may then be stored along with timestamps, so as to show a timeline of events for a given threat (e.g., as shown in graphical user interface 1005 of FIG. 10). In some instances, this history timeline may be used to create the time-series depiction and/or animation as described further below with regard to the client device.

Although this monitoring is described with regard to a single enterprise user device 103, similar monitoring may be performed with regard to any number of additional enterprise user devices and/or client devices without departing from the scope of the disclosure. For example, incident response logs (or a single omnibus log) may be generated to include actions performed by other analysts and/or the client. In doing so, the client and/or analyst interfaces may be enabled with information from the incident response lifecycle associated with multiple different analysts and/or the client. In some instances, in compiling the incident response log, the threat framework platform 102, the enterprise user device 103, and/or other devices/systems may compile a log that includes user input (e.g., based on actions performed to address the particular threat), timestamps corresponding to this user input, identities of the corresponding user (e.g., analyst, client, or the like), and/or other information.

Although the monitoring of the analyst interactions is described with regard to providing a client interface, the information obtained through such monitoring may, in some instances, be used to inform the analyst interfaces as well. For example, tips for improving consistency between users, effectiveness in threat mitigation, and/or other alerts/information may be provided based on the interaction information. In some instances, to do so, analyst interaction information may be fed into a machine learning model to identify, for example, if the analyst is deviating from a predicted course of action (which may, e.g., be based on the interactions of senior and/or other experienced analysts). In these instances, different trust levels may be assigned (e.g., within the model) to analysts based on their experience, which may, e.g., be used to perform weighted evaluation of a given analysts actions, and provide recommendations accordingly. Additionally or alternatively, the predicted course of action (e.g., one or more actions of the incident response lifecycle) may be automatically identified (e.g., using a machine learning model and based on historical cyber threat investigation information corresponding to one or more analysts) and presented to an analyst for execution and/or automatically executed.

Referring to FIG. 2D, at step 213, the threat framework platform 102 may generate a client interface based on the cyber threat investigation information and the client identification information included in the incident response log from step 212. In some instances, the threat framework platform 102 may generate the client interface based on the analyst interface generated at step 208. For example, the client interface may be a different version of the analyst interface, configured for display to the client rather than the analyst. For example, the threat framework platform 102 may generate an interface that includes incident response information, such as, for example, actions performed by the analyst to address a given threat (e.g., throughout the incident response lifecycle). In some instances, generating the client interface may be based on the client identification information, and thus the client interface may be uniquely generated for the corresponding client. In some instances, generating the client interface may include generating a time-series graphical representation of the actions performed (e.g., based on the incident response log). For example, the client interface and/or time-series graphical representation may include one or more of: analyst findings, investigation information, enrichment information of the analyst findings, events corresponding to the analyst findings, and/or other information. In some instances, the client interface may also be configured to include a play button, which may trigger an automated progression through the time-series graphical representation within the client interface upon selection. For example, the client interface may include findings from and/or actions performed by the analyst (e.g., we've isolated a file, found malware, submitted to the security lifecycle review (SLR) team, and/or other actions) and/or any recommended courses of action/updates for the client. Additionally or alternatively, the client interface may include any other seemingly relevant information for the client (e.g., searches and corresponding results, research that was conducted, and/or other information).

Figure 11:
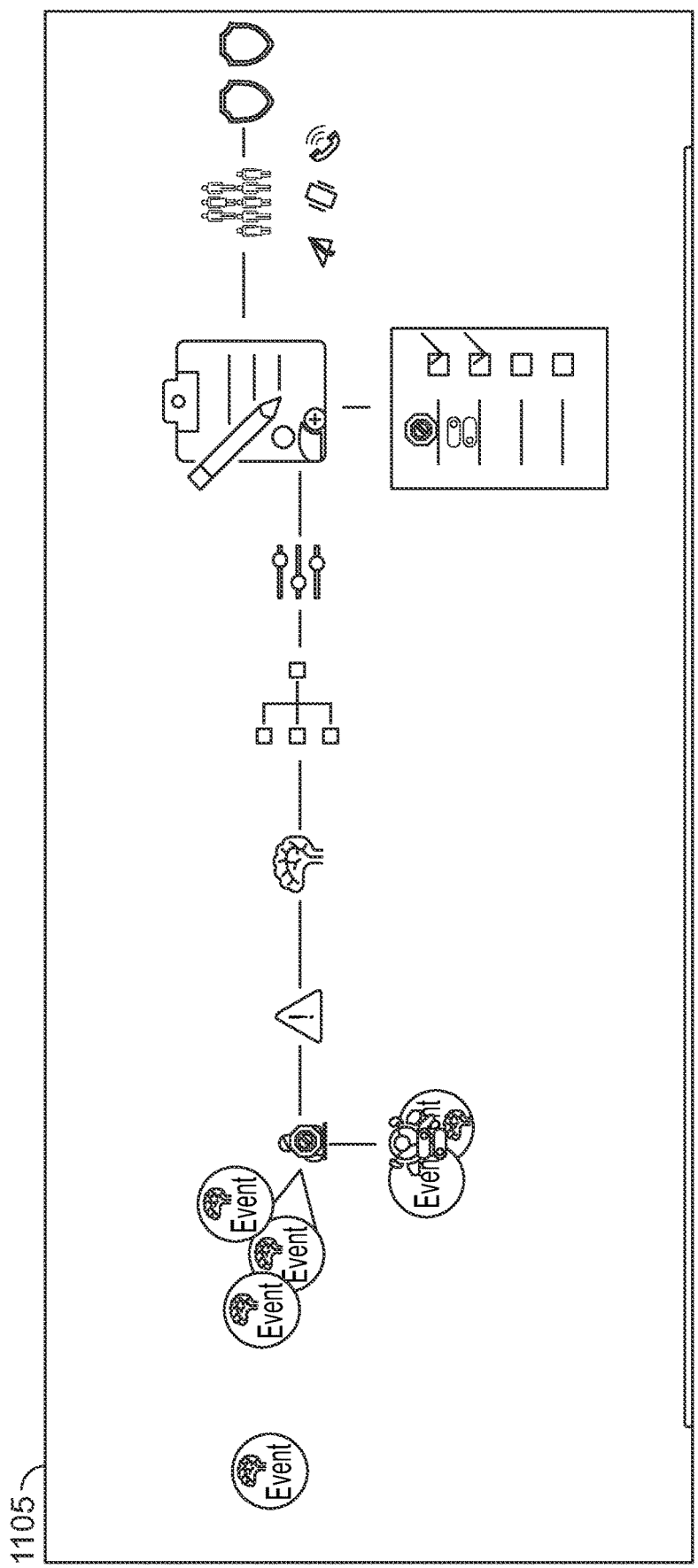

In some instances, a video and/or other animated depiction of the time-series graphical representation may be included on the client interface. For example, an animation as depicted in graphical user interface 1105 of FIG. 11 may be displayed. Although a number of interface elements are displayed on the graphical user interface 1105, this is for illustrative purposes, and these elements may be added to the interface (e.g., in sequential order) as various actions are performed and/or events are identified. For example, initially, two events (e.g., credential dumping, log reading, badge reading, and/or other events may be identified). In this instance, the animation may be updated to include an event circle for each event (e.g., as represented by the black "event" circles on the left side of graphical user interface 1105. These events may be passed to an analyst (e.g., as represented by the human element on graphical user interface 1105 occurring sequentially after the event elements). Subsequently, an alert may be generated (e.g., triggered by the analyst), and an interface element corresponding to the alert may be added to the animation (e.g., as represented by the exclamation triangle element of graphical user interface 1105). Next, intelligence may be pulled that is related to the alert, and used to enrich the event (e.g., as described above with regard to FIGS. 8-10). This may be represented by the brain element on the graphical user interface 1105). The enriched events may then be run through a pattern matching algorithm and/or model to identify a playbook of actions to be performed (e.g., as represented by the bracket element on the graphical user interface 1105). In some instances, this pattern matching may reveal additional related events that may be relevant to the corresponding threat (which may, e.g., then also be added to the animation, as represented by the grey event elements on the graphical user interface 1105). The actions of the identified playbook may then be added to a queue for one or more analysts to perform, and the corresponding analysts may be assigned (e.g., as represented by the clipboard and checklist elements of the graphical user interface 1105). The given analysts may then begin performing the remediation actions listed in the queue, and each action may be recorded and communicated to the client (e.g., which may be illustrated by the group of people on the right side of the graphical user interface 1105). Similarly, as these remediation actions (e.g., isolate machine, reset password, or the like) are performed, the checklist may be dynamically completed (e.g., as illustrated by the checkmarks on the checklist element of the graphical user interface 1105), and the protection shield elements may be added to the graphical user interface 1105).

In these instances, the above described events may be illustrated as a time-series, and played back to an analyst or client in response to selection of a play button (e.g., so as to show the corresponding interface elements appearing on the animation in the order in which they were performed). For example, an automated progression through this time-series graphical representation may be performed in response to selection of the play button. For example, the displaying the time-series graphical representation and/or animation may initially displaying one or more events of the incident response lifecycle at one or more initial points in time on the time-series graphical representation. Then, after displaying the one or more events and at a second point in time on the time-series graphical representation, later than the one or more initial points in time, an alert generated element, indicating that an alert has been generated corresponding to the one or more events, may be displayed. After displaying the alert generated element and at a third point in time on the time-series graphical representation, later than the second point in time, an information enrichment element, indicating that the one or more events have been enriched with additional threat information, may be displayed. After displaying the information enrichment element and at a fourth point in time on the time-series graphical representation, later than the third point in time, a pattern matching element, indicating that pattern matching has been performed for the one or more events to identify the actions, may be displayed. After displaying the pattern matching element and at a fifth point in time on the time-series graphical representation, later than the fourth point in time, a checklist of the actions, may be displayed. In some instances, the checklist may be configured to dynamically update in real time as the corresponding actions are completed. After displaying the checklist and at a sixth point in time on the time-series graphical representation, later than the fifth point in time, a client communication element indicating that the client has been notified of one or more of: the one or more events, the additional threat information, the pattern matching, the actions, and the checklist may be displayed. After the client communication element and at a seventh point in time on the time series graphical representation, later than the sixth point in time, a protective actions element, indicating that one or more of the actions have been completed may be displayed. In some instances, the time-series graphical representation may be configured to display, to both an analyst of the enterprise user device and the client, a dynamic timeline of the incident response lifecycle from birth of the identified threat to resolution of the identified threat.

In some instances, this may allow both technical analysts and non-technical clients to understand a visualization of the incident response lifecycle. For example, it may visualize how long a response took, any delays associated with the response, whether delays were caused by clients or analysts, and/or other information). In some instances, selection of an element on the animation may cause corresponding information to be displayed. For example, selection of the checklist element of graphical user interface 1105 may cause audit logs to be displayed, including a list of completed actions to address the threat. Furthermore, by automatically completing the generation of the interface, analysts may be relieved of the need to record, document, and/or otherwise communicate their incident response actions to clients.

Although generation of the client interface and the corresponding time-series graphical representation are described at step 213, the client interface may be dynamically updated in real time throughout the incident response lifecycle. In these instances, the time-series graphical representation may be similarly updated. For example, updated versions of the client interface may be continuously and/or otherwise generated. Furthermore, although generation of the client interface is shown separately from generation of the analyst interface at step 208, this is for illustrative purposes only in showing the effect of recording actions of the analyst and using them to inform the time-series representation displayed in the client interface. In some instances, however, a single interface displayable to both the client and the analyst may be generated and subsequently displayed and/or dynamically updated as described herein. For example, the time-series representation described with regard to the client interface may, in some instances, be displayed to both the analyst and the client. Additionally or alternatively, different versions of the same interface may be displayed to the analyst and the client (e.g., certain information included in the analyst interface may be redacted from the client interface).

At step 214, the threat framework platform 102 may send the client interface to the client device 104. For example, the threat framework platform 102 may send the client interface to the client device 104 via the communication interface 113 and while a wired or wireless data connection is established with the client device 104. In some instances, the threat framework platform 102 may also send one or more commands directing the client device 104 to display the client interface. In some instances, a single client interface may have been generated at step 213, and a specific view of that client interface may be sent to the client device 104 depending on the client identification information.

At step 215, based on or in response to the one or more commands directing the client device 104 to display the client interface, the client device 104 may display the client interface. For example, the client device 104 may display a graphical user interface similar to graphical user interface 605, which is illustrated in FIG. 6. For example, the client device 104 may display the time-series graphical representation of the actions performed. In some instances, selection of the play button may cause a first portion of the time-series graphical representation, currently displayed on the client interface, to shift off of the client interface, and cause a second portion of the time-series graphical representation to shift on to the client interface (e.g., so as to cause older actions, performed before newer actions, to shift off of the screen and be replaced by the newer actions). Additionally or alternatively, the client device 104 may display a graphical user interface similar to graphical user interface 1105, as described above.

In some instances, the client device 104 may receive feedback from the client via the client interface (e.g., feedback on the incident response lifecycle, including actions performed, and/or other information). In these instances, the client device 104 may communicate the feedback to the threat framework platform 102, which may, e.g., dynamically update the analyst interface and send the updated analyst interface to the enterprise computing device 103 for display. For example, the client device 104 may receive feedback that a particular action, not yet performed, should not be performed (or that an action, not listed as part of an action plan, should be performed). In these instances, the analyst interface may be updated so as to reflect this feedback provided by the client so that the remaining actions to be performed are adjusted accordingly. In some instances, the displayed client interface may be dynamically updated based on any updates to the client interface by the threat framework platform 102.

In displaying these interfaces to both analysts and clients, clients may easily be advised of the monitoring/analysis efforts being performed for a particular threat (e.g., via both textual information and visualizations). This may also be useful in providing an audit trail for both clients and analysts. The interfaces may include operational intelligence, client attributes, an automated timeline process, and/or other information all as part of a single interface, available to both clients and analysts. In some instances, different information may be displayed through the client and analyst interfaces, though they may also share a considerable amount of information. In doing so, analysts may be guided through the incident response lifecycle, and clients may be aware of the analyst response in real time.

Figure 3:
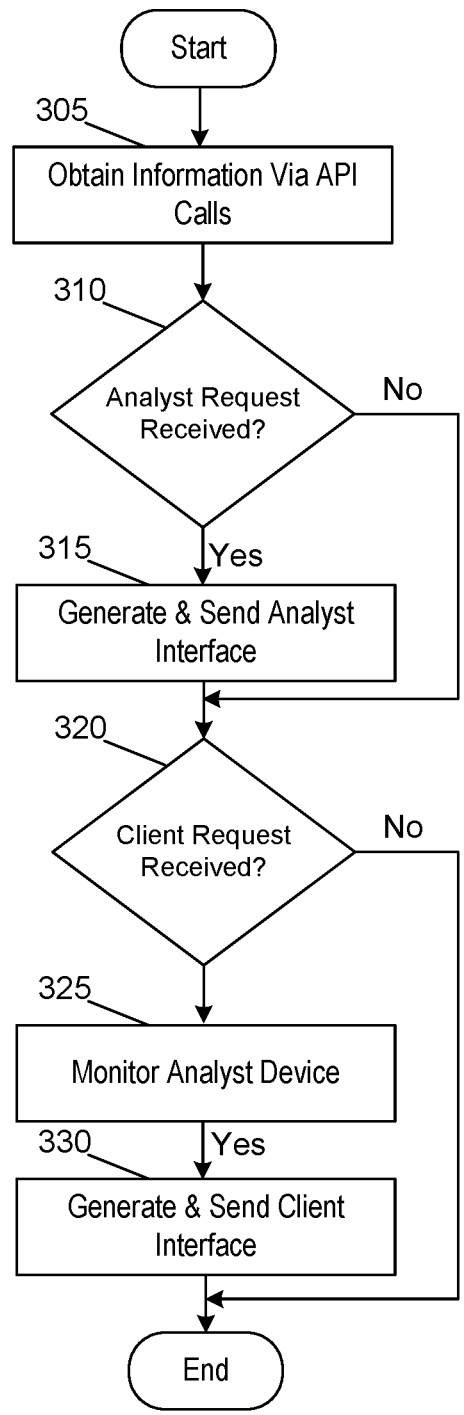
FIG. 3 depicts an illustrative method for an enhanced cyber threat analysis framework in accordance with one or more example embodiments.

FIG. 3 depicts an illustrative method for an enhanced cyber threat analysis framework in accordance with one or more example embodiments. Referring to FIG. 3, at step 305, a computing platform having at least one processor, a communication interface, and memory may obtain RA/RP information, internal threat intelligence information, external threat intelligence information, and/or other information via API calls to one or more other computing systems. At step 310, the computing platform may identify whether a request was received from an analyst computing device for a threat intelligence interface. If not, the computing platform may proceed to step 320. If a request was received from an analyst computing device, the computing platform may proceed to step 315.

At step 315, the computing platform may generate the analyst interface, and send it to the analyst computing device for display. At step 320, the computing platform may identify whether or not an interface request was received from a client device. If a request was not received, the method may end. If a request was received, the computing platform may proceed to step 325.

At step 325, the computing platform may monitor the analyst computing device for interaction information. At step 330, the computing platform may generate a client interface (based on the analyst interface and the interaction information), and may send the client interface to the client device for display.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   install, on the computing platform, incident response documentation software, configured to record actions performed at the computing platform to remediate threats through a plurality of incident response lifecycles;
   display a graphical user interface including threat intelligence information, wherein the threat intelligence information includes one or more actions to be performed by an analyst, corresponding to the computing platform, to address a threat throughout an incident response lifecycle;
   receive, via the graphical user interface, user input corresponding to the one or more actions;
   automatically record, using the incident response documentation software, the user input;
   automatically compile, based on the user input, an incident response log; and
   send, to a central threat framework platform, the incident response log, wherein one or more additional graphical user interfaces are generated based on the incident response log.

2. The computing platform of claim 1, wherein automatically recording the user input comprises:
   identifying completion of a particular action of the one or more actions by an analyst operating the computing platform; and
   storing, by the computing platform and in real time:
      an indication of the completion,
      a timestamp of the completion, and
      results of the completion, wherein:
         automatically recording the user input avoids manual recordation of the user input by the analyst and makes the user input visible, in real time, to the analyst, other analysts, and a client associated with the threat, and
         the user input comprises user input corresponding to one or more of: alert generation actions, information enrichment actions, pattern matching actions, checklist completion actions, client notification actions, and threat remediation actions.

3. The computing platform of claim 1, wherein the incident response documentation software is further installed at a second computing platform and is configured to record actions performed at the second computing platform to remediate the threats through the plurality of incident response lifecycles.

4. The computing platform of claim 3, wherein the second computing platform corresponds to a second analyst.

5. The computing platform of claim 3, wherein the second computing platform corresponds to a client targeted by the threat.

6. The computing platform of claim 3, wherein the incident response log further comprises second user input, received at the second computing platform, corresponding to the actions performed at the second computing platform.

7. The computing platform of claim 1, wherein the incident response log comprises one or more of: the user input, timestamps corresponding to the user input, and an identity of the analyst.

8. The computing platform of claim 1, wherein the one or more additional graphical user interfaces include a time-series graphical representation of the incident response log.

9. The computing platform of claim 1, wherein the memory stores additional computer readable instructions that, when executed by the one or more processors, cause the computing platform to:
   receive, from the central threat framework platform:
      the incident response documentation software, and
      one or more commands directing the computing platform to install the incident response documentation software, wherein installation of the incident response documentation software is in response to the one or more commands directing the computing platform to install the incident response documentation software.

10. The computing platform of claim 1, wherein the memory stores additional computer readable instructions that, when executed by the one or more processors, cause the computing platform to:
   display, at the computing platform, the one or more additional graphical user interfaces, wherein the one or more additional graphical user interfaces comprise updated versions of the graphical user interface.

11. The computing platform of claim 1, wherein the incident response log corresponds to the incident response lifecycle.

12. A method comprising:
   at a computing platform, comprising at least one processor, a communication interface, and memory:
      installing, on the computing platform, incident response documentation software, configured to record actions performed at the computing platform to remediate threats through a plurality of incident response lifecycles;
      displaying a graphical user interface including threat intelligence information, wherein the threat intelligence information includes one or more actions to be performed by an analyst, corresponding to the computing platform, to address a threat throughout an incident response lifecycle;
      receiving, via the graphical user interface, user input corresponding to the one or more actions;
      automatically recording, using the incident response documentation software, the user input;
      automatically compiling, based on the user input, an incident response log; and
      sending, to a central threat framework platform, the incident response log, wherein one or more additional graphical user interfaces are generated based on the incident response log.

13. The method of claim 12, wherein automatically recording the user input comprises:
   identifying completion of a particular action of the one or more actions by an analyst operating the computing platform; and
   storing, by the computing platform and in real time:
      an indication of the completion,
      a timestamp of the completion, and
      results of the completion, wherein:
         automatically recording the user input avoids manual recordation of the user input by the analyst and makes the user input visible, in real time, to the analyst, other analysts, and a client associated with the threat, and
         the user input comprises user input corresponding to one or more of: alert generation actions, information enrichment actions, pattern matching actions, checklist completion actions, client notification actions, and threat remediation actions.

14. The method of claim 12, wherein the incident response documentation software is further installed at a second computing platform and is configured to record actions performed at the second computing platform to remediate the threats through the plurality of incident response lifecycles.

15. The method of claim 14, wherein the second computing platform corresponds to a second analyst.

16. The method of claim 14, wherein the second computing platform corresponds to a client targeted by the threat.

17. The method of claim 14, wherein the incident response log further comprises second user input, received at the second computing platform, corresponding to the actions performed at the second computing platform.

18. The method of claim 12, wherein the incident response log comprises one or more of: the user input, timestamps corresponding to the user input, and an identity of the analyst.

19. The method of claim 12, wherein the one or more additional graphical user interfaces include a time-series graphical representation of the incident response log.

20. One or more non-transitory computer-readable media storing instructions that, when executed by a computing platform, comprising at least one processor, a communication interface, and memory, cause the computing platform to:
   installing, on the computing platform, incident response documentation software, configured to record actions performed at the computing platform to remediate threats through a plurality of incident response lifecycles;
   display a graphical user interface including threat intelligence information, wherein the threat intelligence information includes one or more actions to be performed by an analyst, corresponding to the computing platform, to address a threat throughout an incident response lifecycle;
   receive, via the graphical user interface, user input corresponding to the one or more actions;
   automatically record, using the incident response documentation software, the user input;
   automatically compile, based on the user input, an incident response log; and
   send, to a central threat framework platform, the incident response log, wherein one or more additional graphical user interfaces are generated based on the incident response log.

* * * * *